US012596887B2

(12) United States Patent
Laban et al.

(10) Patent No.: US 12,596,887 B2
(45) Date of Patent: Apr. 7, 2026

(54) SYSTEMS AND METHODS FOR TEXT SIMPLIFICATION WITH DOCUMENT-LEVEL CONTEXT

(71) Applicant: Salesforce, Inc., San Francisco, CA (US)

(72) Inventors: Philippe Laban, New York, NY (US); Jesse Vig, Los Altos, CA (US); Wojciech Kryscinski, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 334 days.

(21) Appl. No.: 18/460,373

(22) Filed: Sep. 1, 2023

(65) Prior Publication Data

US 2024/0249082 A1     Jul. 25, 2024

Related U.S. Application Data

(60) Provisional application No. 63/480,593, filed on Jan. 19, 2023.

(51) Int. Cl.
G06F 17/27 (2006.01)
G06F 40/166 (2020.01)
(Continued)

(52) U.S. Cl.
CPC ............ G06F 40/40 (2020.01); G06F 40/166 (2020.01); G06F 40/284 (2020.01); G06F 40/30 (2020.01)

(58) Field of Classification Search
CPC .... G06F 16/345; G06F 40/40; G06F 16/3344;

G06F 40/20; G06F 40/284; G06F 40/166; G06F 40/30; G06F 18/214; G06F 16/93; G06F 16/215; G06F 40/47; G06F 40/45; G06F 16/36; G06N 20/00; G06N 3/08; G06N 3/02; G06N 3/084
See application file for complete search history.

(56) References Cited

U.S. PATENT DOCUMENTS

2021/0279638 A1* 9/2021 Kano ..................... G06N 20/00
2023/0386472 A1* 11/2023 Li ......................... G06F 40/284
(Continued)

FOREIGN PATENT DOCUMENTS

CN      112036155 A * 12/2020 ............ G06F 40/211

*Primary Examiner* — Michael Ortiz-Sanchez
(74) *Attorney, Agent, or Firm* — Haynes and Boone, LLP

(57) ABSTRACT

A method of training a text simplification model is provided. A training dataset including a first set of original textual samples and original revision histories and a second set of simplified textual samples and simplified revision histories is received via a data interface. A training pair including an original textual sample and corresponding original revision history from the first set and a counterpart simplified textual sample and corresponding simplified revision history from the second set are identified. An alignment label for a first revision in the corresponding original revision history and a second revision in the corresponding simplified revision history are generated using a neural network-based alignment model from a score. A revision category label for each of the first revision and second revision is generated using a neural network-based classification model. A neural network-based text simplification model is trained based on the updated training dataset.

20 Claims, 21 Drawing Sheets

(51) Int. Cl.
  *G06F 40/284*  (2020.01)
  *G06F 40/30*  (2020.01)
  *G06F 40/40*  (2020.01)

(56) References Cited

U.S. PATENT DOCUMENTS

2023/0419017 A1* 12/2023 Fabbri .................. G06F 40/166
2023/0419051 A1* 12/2023 Sabapathy ............. G06F 40/30
2024/0119220 A1*  4/2024 Aggarwal ............... G06N 3/08

* cited by examiner

440

Joint Group-Categorize
Example: BIC

Group 2

460

| B | Reorder | | | I | Reorder |

Edit operations
- insert
- delete
- keep

Group 1

452 | B | Lexical |

Group 3

| B | Lexical | 454

450 — B/I-Category Tagger

405 — Alignment Sequence

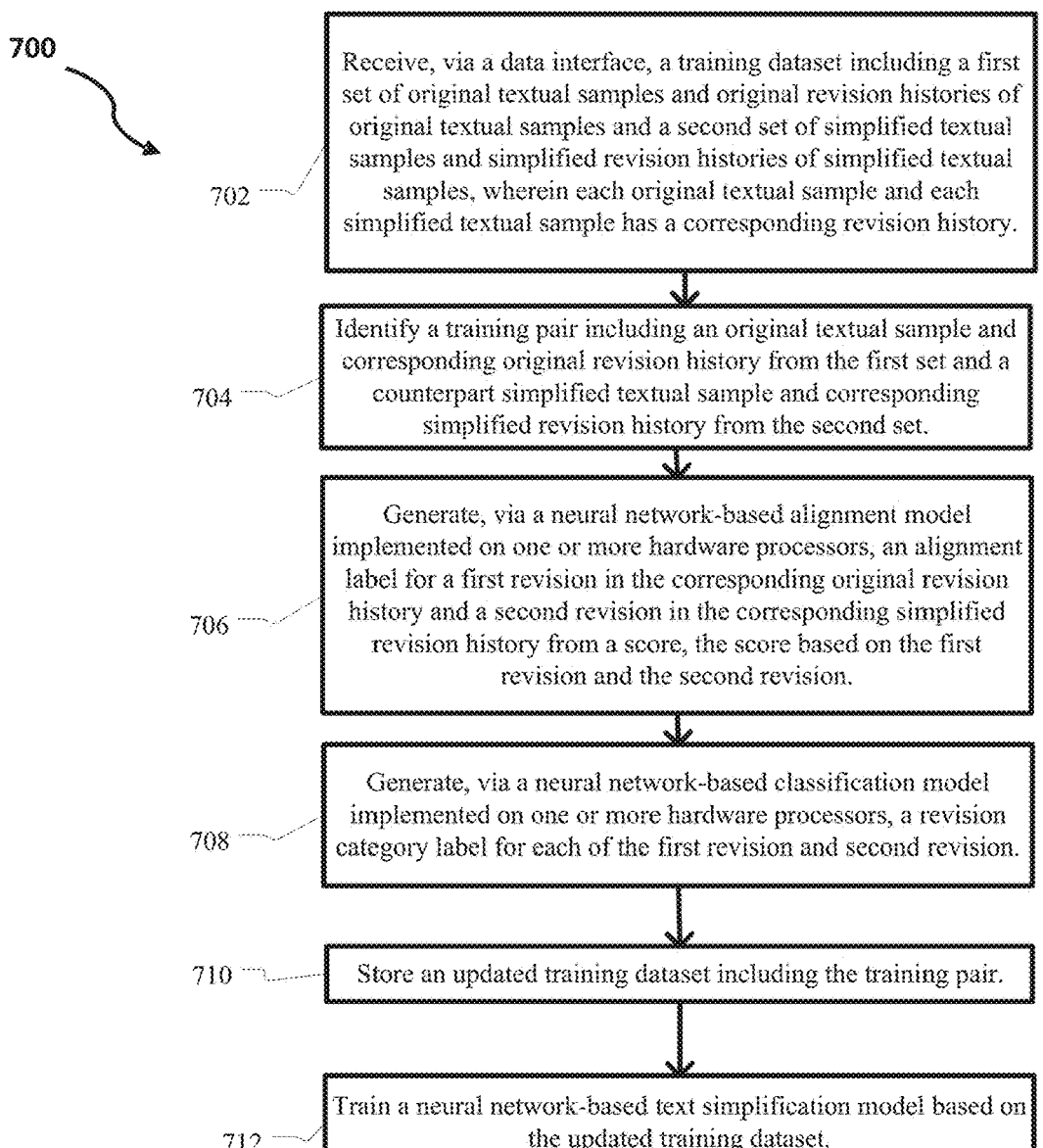

700

702 — Receive, via a data interface, a training dataset including a first set of original textual samples and original revision histories of original textual samples and a second set of simplified textual samples and simplified revision histories of simplified textual samples, wherein each original textual sample and each simplified textual sample has a corresponding revision history.

704 — Identify a training pair including an original textual sample and corresponding original revision history from the first set and a counterpart simplified textual sample and corresponding simplified revision history from the second set.

706 — Generate, via a neural network-based alignment model implemented on one or more hardware processors, an alignment label for a first revision in the corresponding original revision history and a second revision in the corresponding simplified revision history from a score, the score based on the first revision and the second revision.

708 — Generate, via a neural network-based classification model implemented on one or more hardware processors, a revision category label for each of the first revision and second revision.

710 — Store an updated training dataset including the training pair.

712 — Train a neural network-based text simplification model based on the updated training dataset.

FIG. 7

| | Edit Category | N | %E | %O | %I | %D | %I+D |
|---|---|---|---|---|---|---|---|
| Lexical | o Lexical Edit | 6798 | 61.7 | 2.1 | 0.3 | 0.2 | 99.5 |
| | o Entity Edit | 359 | 6.4 | 1.5 | 7.2 | 57.1 | 35.7 |
| Syntactic | o Sentence Split | 3010 | 43.8 | 2.3 | 42.0 | 0.3 | 57.7 |
| | o Sentence Fusion | 334 | 6.0 | 2.4 | 5.7 | 29.0 | 65.3 |
| | o Syntactic Deletion | 1889 | 28.1 | 1.1 | 0.2 | 98.1 | 1.7 |
| | o Syntactic Generic | 2615 | 36.2 | 1.5 | 31.1 | 27.8 | 42.6 |
| Discourse | o Reordering | 2379 | 34.6 | 2.5 | 0.6 | 0.4 | 99.0 |
| | o Anaphora Resolut. | 302 | 5.4 | 1.8 | 21.9 | 7.9 | 70.2 |
| | o Anaphora Insert. | 362 | 6.4 | 1.8 | 20.4 | 0.6 | 79.0 |
| Semantic | o Elaboration - Bkgrd | 805 | 12.9 | 1.4 | 93.2 | 0.4 | 6.5 |
| | o Elaboration - Exple | 139 | 2.4 | 1.5 | 95.7 | 0.0 | 4.3 |
| | o Elaboration - Generic | 3195 | 36.0 | 1.2 | 95.9 | 1.1 | 2.9 |
| | o Semantic Deletion | 12928 | 76.8 | 2.0 | 0.4 | 98.8 | 0.8 |
| | o Specific-to-General | 332 | 5.7 | 2.1 | 0.0 | 6.9 | 93.1 |
| Non-simpl. | o Format | 2688 | 35.3 | 1.9 | 9.7 | 10.5 | 79.7 |
| | o Noise Deletion | 693 | 10.6 | 1.6 | 2.2 | 93.7 | 4.2 |
| | o Fact Correction | 290 | 5.0 | 2.3 | 4.5 | 2.8 | 92.8 |
| | o Extraneous Info | 3028 | 36.5 | 2.2 | 99.4 | 0.1 | 0.5 |
| | o Miscellaneous | 241 | 3.6 | 1.7 | 68.9 | 1.7 | 29.5 |

FIG. 8

|  | In-Domain 71,702 cats. | | | OOD 3 cats. |
|---|---|---|---|---|
|  | Train | Valid | Test | Test |
| Manually Annotated | 3,861 | 484 | 484 | 377 |
| Silver Annotated | 126k | 7k | 7k | - |

FIG. 9

| Model Name | Cat F1 | Class F1 | %Part | %Exact |
|---|---|---|---|---|
| Op Majority | 26.1 | 30.3 | - | - |
| Adjacent-CC | 56.7 | 60.4 | 48.2 | 50.8 |
| BI-CC | 64.4 | 67.8 | 56.4 | 60.0 |
| Oracle-CC | 78.2 | 81.4 | - | - |
| CT-Single | 69.7 | 74.1 | 27.8 | 27.8 |
| CT-Adjacent | 69.7 | 74.1 | 58.3 | 60.8 |
| CT-Rules | 69.7 | 74.1 | 58.4 | 62.1 |
| BIC | 70.6 | 74.0 | 59.7 | 64.7 |
| Seq2Seq | 51.3 | 55.4 | 42.5 | 45.7 |

FIG. 11

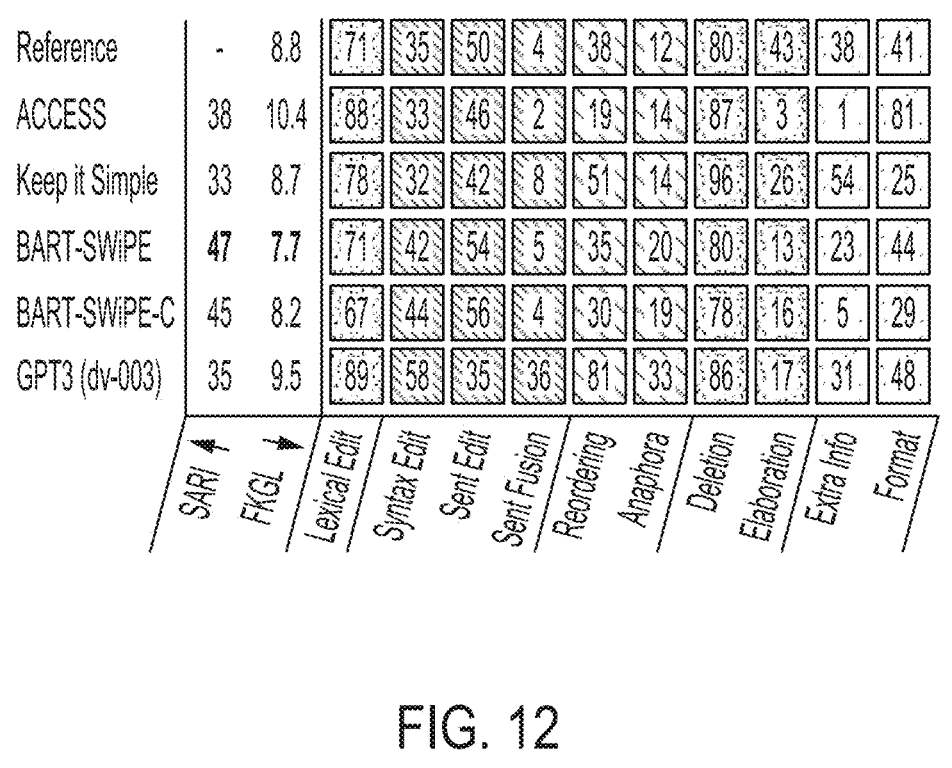

| | SARI ↑ | FKGL ↓ | Lexical Edit | Syntax Edit | Sent Edit | Sent Fusion | Reordering | Anaphora | Deletion | Elaboration | Extra Info | Format |
|---|---|---|---|---|---|---|---|---|---|---|---|---|
| Reference | - | 8.8 | 71 | 35 | 50 | 4 | 38 | 12 | 80 | 43 | 38 | 41 |
| ACCESS | 38 | 10.4 | 88 | 33 | 46 | 2 | 19 | 14 | 87 | 3 | 1 | 81 |
| Keep it Simple | 33 | 8.7 | 78 | 32 | 42 | 8 | 51 | 14 | 96 | 26 | 54 | 25 |
| BART-SWIPE | 47 | 7.7 | 71 | 42 | 54 | 5 | 35 | 20 | 80 | 13 | 23 | 44 |
| BART-SWIPE-C | 45 | 8.2 | 67 | 44 | 56 | 4 | 30 | 19 | 78 | 16 | 5 | 29 |
| GPT3 (dv-003) | 35 | 9.5 | 89 | 58 | 35 | 36 | 81 | 33 | 86 | 17 | 31 | 48 |

FIG. 12

| Model Name | Validation | | | Test | | |
|---|---|---|---|---|---|---|
| | P | R | F1 | P | R | F1 |
| Majority | 59.0 | 100.0 | 74.2 | 62.6 | 100.0 | 77.0 |
| $\Delta$Publish | 60.1 | 97.7 | 74.2 | 63.3 | 96.8 | 76.6 |
| Lev. Ratio | 63.1 | 100.0 | 76.3 | 65.9 | 96.3 | 78.3 |
| Partial Lev. R | 64.9 | 97.2 | 77.8 | 66.7 | 94.2 | 78.1 |
| Ent. Overlap | 79.8 | 82.5 | 81.1 | 75.9 | 75.1 | 75.5 |
| SummaC$_{Doc}$ | 77.0 | 92.7 | 84.1 | 77.9 | 91.5 | 84.2 |
| Supervised | 88.9 | 81.4 | 85.0 | 83.9 | 85.2 | 84.5 |

FIG. 13

| | Edit Category | Manual | | Silver | | |
|---|---|---|---|---|---|---|
| | | N | %E | N | %E | *k* |
| Lexical | ○ Lexical Edit | 6789 | 61.7 | 246k | 62.0 | 0.62 |
| | ○ Entity Edit | 359 | 6.4 | 9553 | 5.7 | 0.36 |
| Syntactic | ○ Sentence Split | 3010 | 43.8 | 93k | 41.1 | 0.83 |
| | ○ Sentence Fusion | 334 | 6.0 | 8141 | 4.6 | 0.34 |
| | ○ Syntactic Deletion | 1889 | 28.1 | 45k | 24.5 | 0.47 |
| | ○ Syntactic Generic | 2615 | 36.2 | 65k | 31.6 | 0.40 |
| Discourse | ○ Reordering | 2379 | 34.6 | 75k | 32.2 | 0.50 |
| | ◎ Anaphora Resolut. | 302 | 5.4 | 13k | 7.6 | 0.30 |
| | ◎ Anaphora Insert. | 362 | 6.4 | 11k | 7.2 | 0.73 |
| Semantic | ○ Elaboration - Bkgrd | 805 | 12.9 | 1164 | 0.7 | 0.18 |
| | ○ Elaboration - Exple | 139 | 2.4 | 139 | 0.1 | 0.05 |
| | ○ Elaboration - Generic | 3195 | 36.0 | 91k | 37.6 | 0.09 |
| | ○ Semantic Deletion | 12928 | 76.8 | 343k | 73.6 | 0.83 |
| | ○ Specific-to-General | 332 | 5.7 | 1227 | 0.8 | 0.25 |
| Non-simpl. | ○ Format | 2688 | 35.3 | 82k | 35.2 | 0.58 |
| | ○ Noise Deletion | 693 | 10.6 | 14k | 7.9 | 0.58 |
| | ○ Fact Correction | 290 | 5.0 | 4581 | 2.4 | 0.37 |
| | ○ Extraneous Info | 3028 | 36.5 | 105k | 37.0 | 0.69 |
| | ○ Miscellaneous | 241 | 3.6 | 1820 | 0.8 | 0.0 |

FIG. 14

| Edit Category | N | Cat F-1 | % Part | % Exact |
|---|---|---|---|---|
| 4 Semantic Deletion | 12928 | 87.8 | 73.0 | 76.3 |
| 1 Lexical Edit | 6789 | 70.4 | 61.6 | 64.8 |
| 4 Elaboration - Generic | 3195 | 40.8 | 34.9 | 35.1 |
| 5 Extraneous Info | 3028 | 75.3 | 47.7 | 55.0 |
| 2 Sentence Split | 3010 | 83.5 | 55.6 | 69.9 |
| 5 Format | 2688 | 73.3 | 60.5 | 65.6 |
| 2 Syntactic Generic | 2615 | 70.7 | 63.0 | 63.3 |
| 3 Reordering | 2379 | 51.1 | 27.1 | 51.1 |
| 2 Syntactic Deletion | 1889 | 54.0 | 47.9 | 47.9 |
| 4 Elaboration - Bkgrd | 805 | 23.0 | 26.3 | 26.3 |
| 5 Noise Deletion | 693 | 61.1 | 48.7 | 48.7 |
| 3 Anaphora Insert. | 362 | 50.5 | 42.9 | 42.9 |
| 1 Entity Edit | 359 | 39.2 | 39.7 | 39.7 |
| 2 Sentence Fusion | 334 | 50.7 | 27.4 | 32.3 |
| 4 Specific-to-General | 332 | 17.2 | 15.9 | 15.9 |
| 3 Anaphora Resolut. | 302 | 62.7 | 57.1 | 57.1 |
| 5 Miscellaneous | 241 | 45.2 | 28.9 | 31.6 |
| 5 Fact Correction | 290 | 47.7 | 31.8 | 40.9 |
| 4 Elaboration - Exple | 139 | 11.1 | 16.7 | 16.7 |

FIG. 15

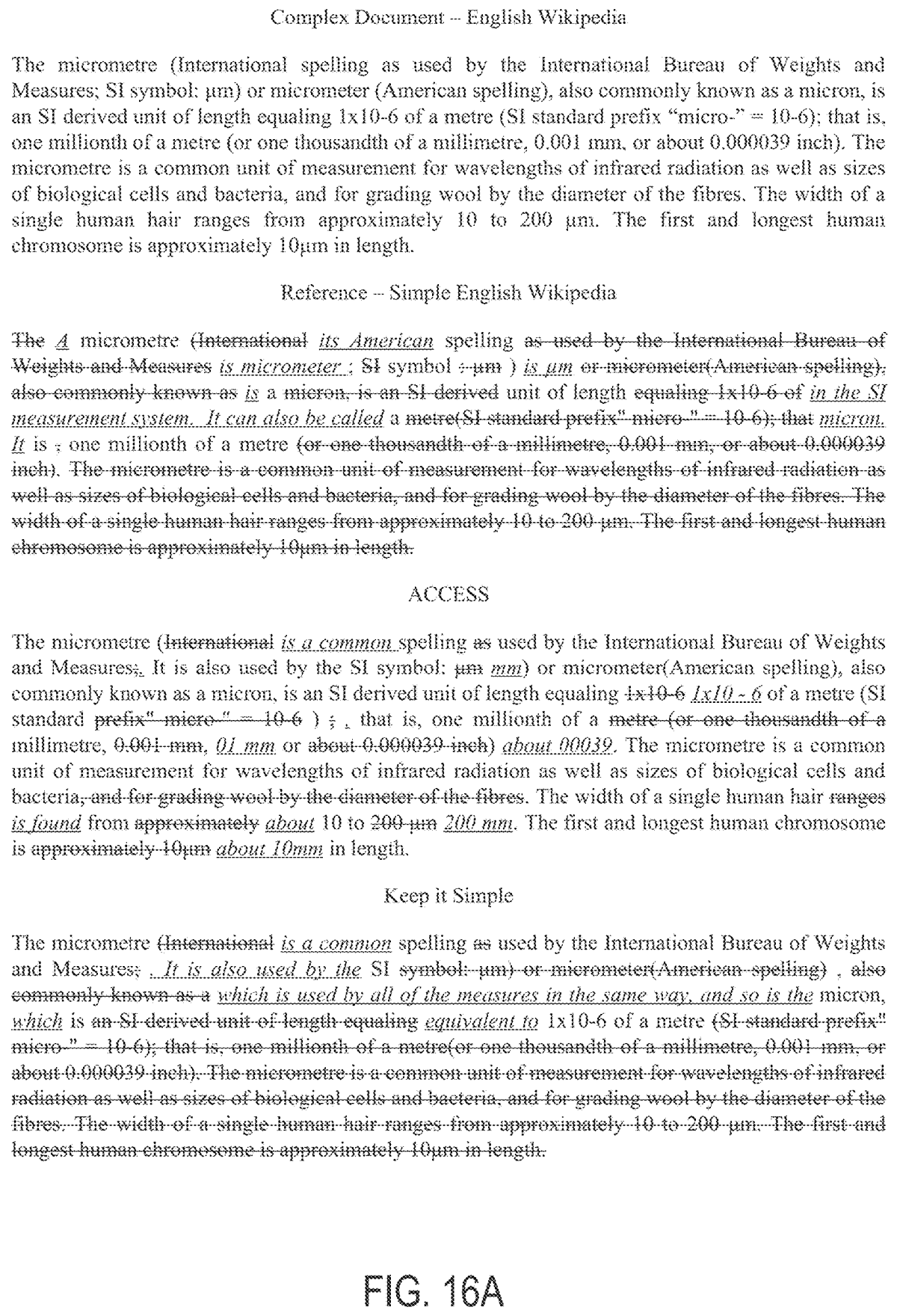

Complex Document – English Wikipedia

The micrometre (International spelling as used by the International Bureau of Weights and Measures; SI symbol: μm) or micrometer (American spelling), also commonly known as a micron, is an SI derived unit of length equaling 1x10-6 of a metre (SI standard prefix "micro-" = 10-6); that is, one millionth of a metre (or one thousandth of a millimetre, 0.001 mm, or about 0.000039 inch). The micrometre is a common unit of measurement for wavelengths of infrared radiation as well as sizes of biological cells and bacteria, and for grading wool by the diameter of the fibres. The width of a single human hair ranges from approximately 10 to 200 μm. The first and longest human chromosome is approximately 10μm in length.

Reference – Simple English Wikipedia

~~The~~ _A_ micrometre ~~(International~~ _its American_ spelling ~~as used by the International Bureau of~~ ~~Weights and Measures~~ _is micrometer_ : SI symbol ~~: μm~~ ) _is μm_ ~~or micrometer(American spelling),~~ ~~also commonly known as~~ _is_ a ~~micron, is an SI derived~~ unit of length ~~equaling 1x10-6 of~~ _in the SI_ _measurement system. It can also be called_ a ~~metre(SI standard prefix" micro-" = 10-6); that~~ _micron._ _It_ is ~~;~~ one millionth of a metre ~~(or one thousandth of a millimetre, 0.001 mm, or about 0.000039~~ ~~inch). The micrometre is a common unit of measurement for wavelengths of infrared radiation as~~ ~~well as sizes of biological cells and bacteria, and for grading wool by the diameter of the fibres. The~~ ~~width of a single human hair ranges from approximately 10 to 200 μm. The first and longest human~~ ~~chromosome is approximately 10μm in length.~~

ACCESS

The micrometre (~~International~~ _is a common_ spelling ~~as~~ used by the International Bureau of Weights and Measures~~;~~_. It is also used by the_ SI symbol: ~~μm~~ _mm_) or micrometer(American spelling), also commonly known as a micron, is an SI derived unit of length equaling ~~1x10-6~~ _1x10 - 6_ of a metre (SI standard ~~prefix" micro-" = 10-6~~ ) ~~;~~_,_ that is, one millionth of a ~~metre (or one thousandth of a~~ millimetre, ~~0.001 mm,~~ _01 mm_ or ~~about 0.000039 inch)~~ _about 00039_. The micrometre is a common unit of measurement for wavelengths of infrared radiation as well as sizes of biological cells and bacteria~~, and for grading wool by the diameter of the fibres~~. The width of a single human hair ~~ranges~~ _is found_ from ~~approximately~~ _about_ 10 to ~~200 μm~~ _200 mm_. The first and longest human chromosome is ~~approximately 10μm~~ _about 10mm_ in length.

Keep it Simple

The micrometre (~~International~~ _is a common_ spelling ~~as~~ used by the International Bureau of Weights and Measures~~;~~ _. It is also used by the_ SI ~~symbol: μm) or micrometer(American spelling)~~ , also ~~commonly known as a~~ _which is used by all of the measures in the same way, and so is the_ micron, _which_ is ~~an SI derived unit of length equaling~~ _equivalent to_ 1x10-6 of a metre ~~(SI standard prefix"~~ ~~micro-" = 10-6); that is, one millionth of a metre(or one thousandth of a millimetre, 0.001 mm, or~~ ~~about 0.000039 inch). The micrometre is a common unit of measurement for wavelengths of infrared~~ ~~radiation as well as sizes of biological cells and bacteria, and for grading wool by the diameter of the~~ ~~fibres. The width of a single human hair ranges from approximately 10 to 200 μm. The first and~~ ~~longest human chromosome is approximately 10μm in length.~~

FIG. 16A

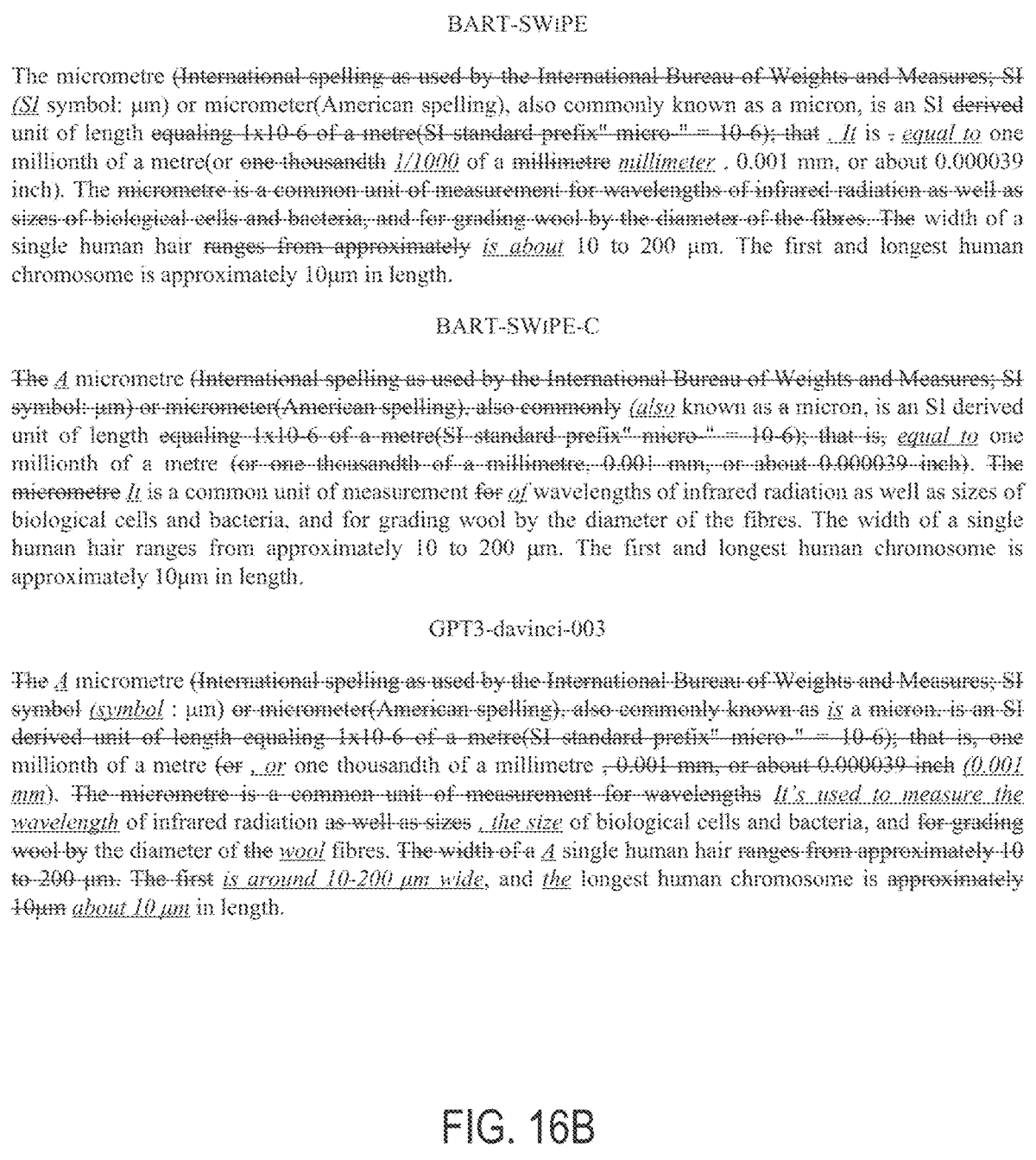

BART-SWiPE

The micrometre ~~(International spelling as used by the International Bureau of Weights and Measures; SI~~ _(SI_ symbol: μm) or micrometer(American spelling), also commonly known as a micron, is an SI ~~derived~~ unit of length ~~equaling 1x10-6 of a metre(SI standard prefix" micro-" = 10-6); that~~ _It_ is ~~,~~ _equal to_ one millionth of a metre(or ~~one-thousandth~~ _1/1000_ of a ~~millimetre~~ _millimeter_ . 0.001 mm, or about 0.000039 inch). The ~~micrometre is a common unit of measurement for wavelengths of infrared radiation as well as sizes of biological cells and bacteria, and for grading wool by the diameter of the fibres. The~~ width of a single human hair ~~ranges from approximately~~ _is about_ 10 to 200 μm. The first and longest human chromosome is approximately 10μm in length.

BART-SWiPE-C

~~The~~ _A_ micrometre ~~(International spelling as used by the International Bureau of Weights and Measures; SI symbol: μm) or micrometer(American spelling), also commonly~~ _(also)_ known as a micron, is an SI derived unit of length ~~equaling 1x10-6 of a metre(SI standard prefix" micro-" = 10-6); that is,~~ _equal to_ one millionth of a metre ~~(or one thousandth of a millimetre, 0.001 mm, or about 0.000039 inch). The micrometre~~ _It_ is a common unit of measurement ~~for~~ _of_ wavelengths of infrared radiation as well as sizes of biological cells and bacteria, and for grading wool by the diameter of the fibres. The width of a single human hair ranges from approximately 10 to 200 μm. The first and longest human chromosome is approximately 10μm in length.

GPT3-davinci-003

~~The~~ _A_ micrometre ~~(International spelling as used by the International Bureau of Weights and Measures; SI symbol~~ _(symbol_ : μm) ~~or micrometer(American spelling), also commonly known as~~ _is_ a micron~~, is an SI derived unit of length equaling 1x10-6 of a metre(SI standard prefix" micro-" = 10-6); that is,~~ one millionth of a metre ~~(or~~ _, or_ one thousandth of a millimetre ~~, 0.001 mm, or about 0.000039 inch~~ _(0.001 mm)_. ~~The micrometre is a common unit of measurement for wavelengths~~ _It's used to measure the wavelength_ of infrared radiation ~~as well as sizes~~ _, the size_ of biological cells and bacteria, and ~~for grading wool by~~ the diameter of ~~the~~ _wool_ fibres. ~~The width of a~~ _A_ single human hair ~~ranges from approximately 10 to 200 μm. The first~~ _is around 10-200 μm wide,_ and ~~the~~ longest human chromosome is ~~approximately 10μm~~ _about 10 μm_ in length.

FIG. 16B

SYSTEMS AND METHODS FOR TEXT SIMPLIFICATION WITH DOCUMENT-LEVEL CONTEXT

CROSS REFERENCE(S)

The instant application is a nonprovisional of and claim priority under 35 U.S.C. 119 to U.S. provisional application No. 63/480,593, filed Jan. 19, 2023, which is hereby expressly incorporated by reference herein in its entirety.

TECHNICAL FIELD

The embodiments relate generally to natural language processing and machine learning systems, and more specifically to text simplification with document-level context.

BACKGROUND

Text simplification includes a generative process that may be performed by machine learning systems to generate, based on an input passage, a "simplified" passage that contains similar sematic meaning but with simpler vocabulary, sentence structure, phrases, and/or the like. Traditionally, text simplification has been largely focused on sentence-level editing. For example, text within a sentence may be modified by the machine learning model for deletion or for reordering within a sentence to result in a simplified sentence. However, many common editing functions require context beyond a single sentence. For example, adding relevant background information may require understanding the surrounding sentences or paragraphs. Therefore, existing text simplification models are not reliably capable of edits/simplifications based on larger than sentence-level contexts.

Therefore, there is a need for a text simplification model with improved accuracy and reliability.

BRIEF DESCRIPTION OF THE DRAWINGS

FIG. 7 is an example logic flow diagram illustrating a method of training a text-simplification model based on the framework shown in FIGS. 1-4, according to some embodiments.

FIGS. 8-16 provide charts illustrating exemplary performance of different embodiments described herein.

Figure 1:
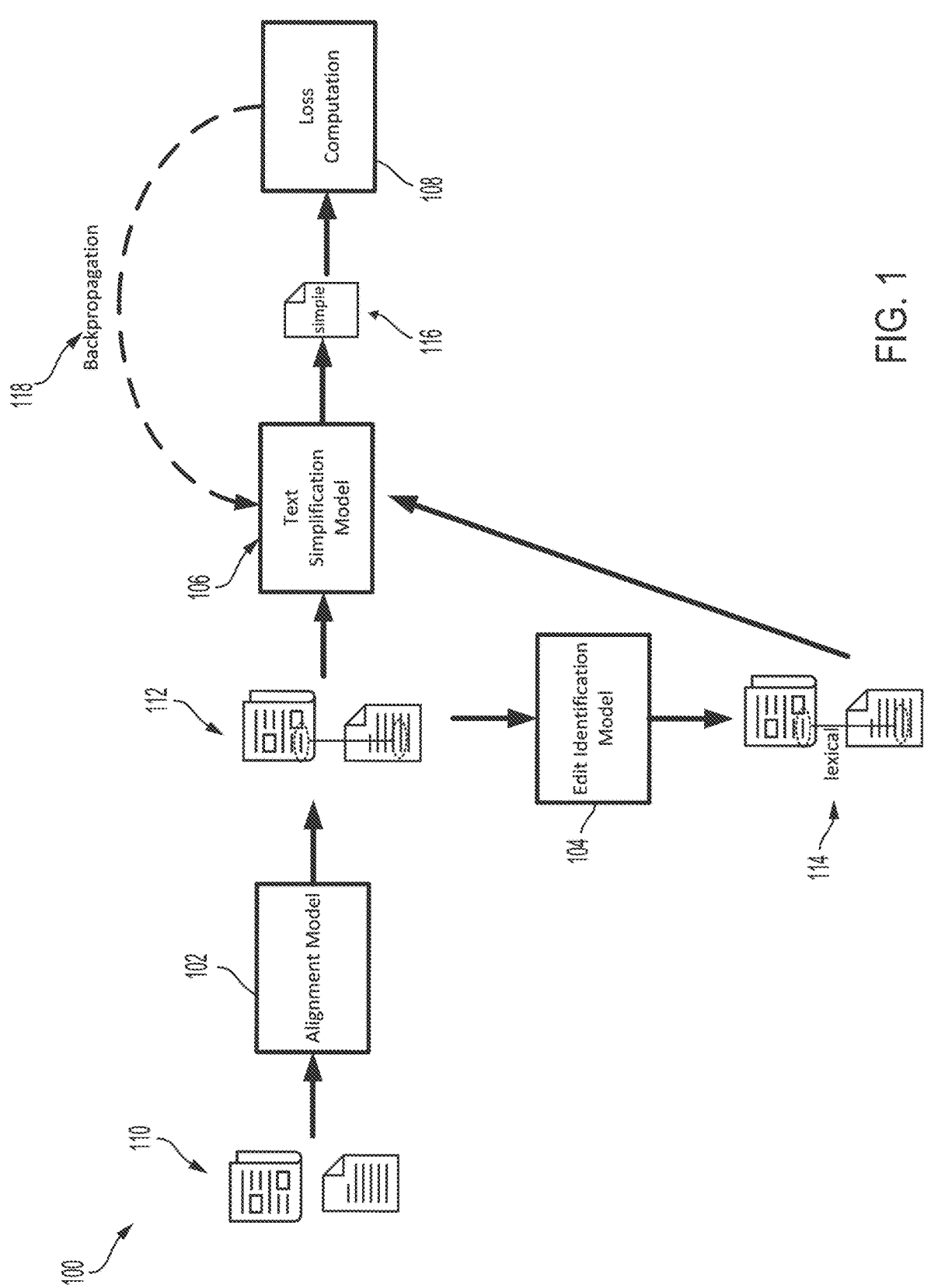
FIG. 1 is a simplified block diagram of a text simplification framework, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Text simplification aims to make complex documents easier to ready, and thus can be more accessible to larger audiences by lowering the barrier of reading for children, non-native speakers, and novice readers in technical domains. Traditionally, text simplification models have largely relied on sentence-level contexts for training and text editing/simplification, i.e., only using the text of a sentence for inferring appropriate edits to that sentence. Text simplification involves a large number of different operations. Words, or groups of words, may be removed, rearranged, or even restated in simpler terms. For example, sometimes an appropriate edit would be to delete repetitive information, but traditional text simplification models would only be able to make the deletion if both instances of the repeated information are in the same sentence. The traditional text simplification models have been approached primarily in a sentence-level sequence-to-sequence manner. Thus, in some sense, they do not "know" anything beyond any given sentence. These models focus on edits such a lexical replacement and sentence splitting. However, many simplification operations require document-level context, e.g., background elaboration, content selection, and content reordering.

In view of the need for improved text simplification models, embodiments described herein provide a text simplification and editing framework based on both sentence-level and document-level contexts. In some aspects, an alignment model may align the revision histories of a training pair of documents, e.g., an original article, and its corresponding simplified article. The revision history includes a sequence of revisions such as the insertions, deletions, or reorderings of words or collections of words within a document. For example, a deletion of a word in the original article (e.g., deleting "historic") may be aligned with the insertion of one or more other words (e.g., insertion of "very famous") in the counterpart simplified document.

After alignment of the revision histories, the revisions/edits may be annotated, e.g., by a classification model, based on their type, e.g., a lexical edit, lexical (of which, the lexical edit is an example), syntactic, discourse, semantic, and non-simplification. The training dataset of documents and their simplified counterparts are thus augmented with alignment information of revisions, and revision types. Using the updated dataset, a text simplification model may be trained to simplify an input text.

Embodiments described herein provide a number of benefits. For example, the text simplification and editing framework can produce more complex edits while generating fewer undesirable edits that potentially introduce factually incorrect content. Therefore, with improved performance on text simplification, neural network technology in natural language processing is improved.

FIG. 1 depicts a simplified block diagram of a text simplification framework 100. In some embodiments, text simplification framework 100 may include an alignment model 102, an edit identification model 104, and text simplification model 106, and loss computation 108. An alignment model 102 may receive training dataset 110, which in some embodiments may comprise original text and simplified text. The alignment model 102 may determine if revisions in an original text and simplified text are aligned, i.e., if they are a particular type of edit. The alignment model 102 may output original and simplified texts that have at least one aligned revision in the form of an alignment sequence, e.g., 112, to the edit identification model 104. An alignment sequence comprises a text sequence with labels for distinguishing between unchanged text, deleted text, and added text between the original and simplified texts. In some embodiments, edit identification model 104 may determine the type of revision, e.g., lexical, for the aligned revisions identified by an alignment model. Edit identification model 104 may include a label for the edit category in the alignment sequence, e.g., 114. In some embodiments, text simplification model 106 may receive the alignment sequence with or without an edit category label, i.e., 112 or 114. The text simplification model 106 may transform the original text in a predicted simplified text 116. The predicted simplified text may be compared against the simplified text in the training dataset 110 using a loss computation block 108. In some embodiments, backpropagation 118 may be used to update the text simplification model 106, and described below with respect to FIG. 5B.

Referring to FIG. 1, in some embodiments, the initial training dataset 110 may be a large dataset of articles and the simplified versions, e.g., Wikipedia entries with pages from EW matched with their counterpart simplified pages in SEW. Wikidata entries with both EW and SEW Wikipedia pages may be selected. A total of 226,861 page pairs, may form the basis for the dataset. In one implementation, each page pair may comprise a complete Wikipedia article and its simplified version, a smaller portion of the complete article and the corresponding simplified version, and/or the like.

In one embodiment, each Wikipedia page may be a live document on a webpage which may be constantly, periodically, intermittently, continuously, and/or on demand updated and revised. Each page has a sequence of versions, each version having a one or more revisions that distinguish it from the previous version. When an editor creates a SEW page, a particular revision of the corresponding EW page may be selected as a starting point and introduce a series of simplifying edits.

Figure 3:
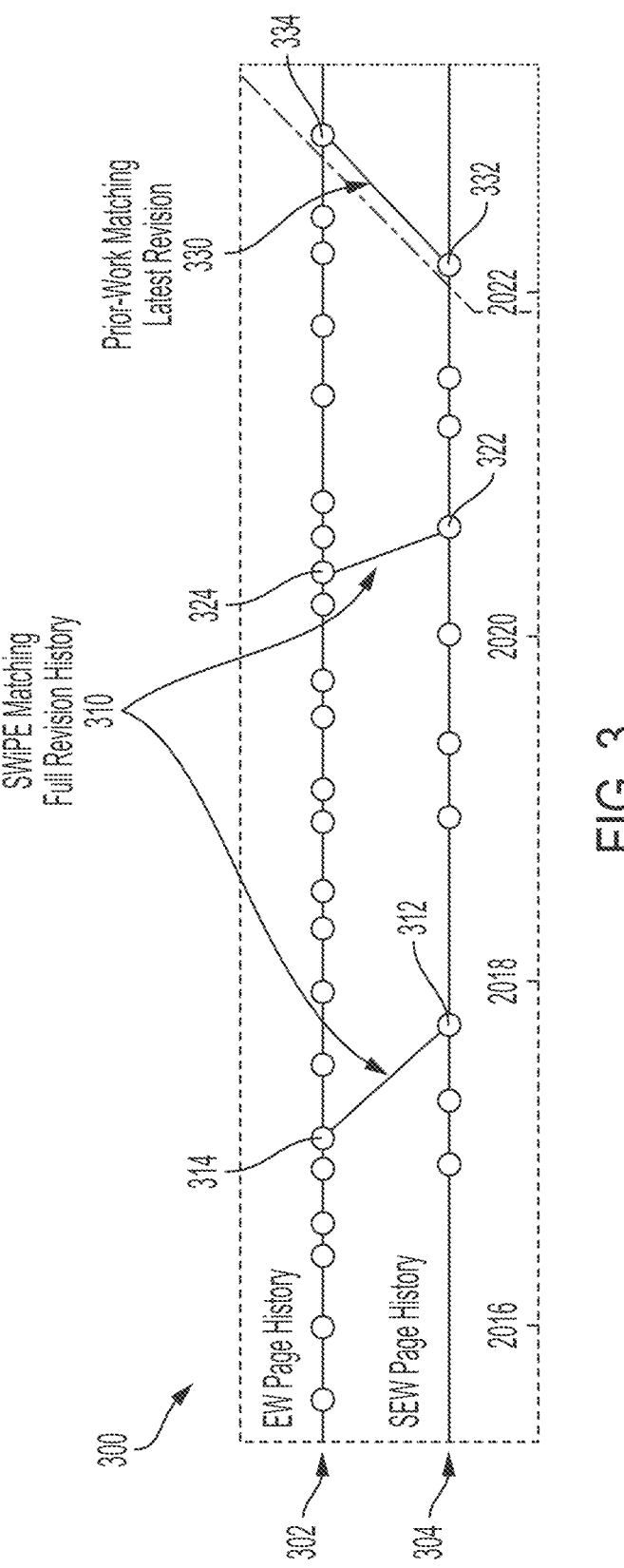
FIG. 3 is a simplified diagram illustrating matched revision histories of documents, according to some embodiments.

Most existing Wikipedia-based simplification datasets rely on matching the latest revisions of page pairs at the time of dataset creation, overlooking page revision history. Considering that EW pages are typically updated more frequently than SEW pages, such approaches might lead to misalignment in the created datasets, thus lowering the data quality. In this disclosure, the full revision history of page pairs with the goal of obtaining higher-quality examples of document-level simplification. A pair of matched revision histories 300 is depicted in FIG. 3 and described herein.

For each page in the 226,861 page pairs, the entire revision history is obtained and 200 full-text revisions are extracted using Wikipedia's API. From these page pairs, 22 million revisions: on average 94 revisions per EW page, and 4 per SEW page. For each SEW revision, the matching process consists of finding the EW revision that aligns best with it. If a SEW page has multiple revisions, then several revisions are included in the dataset, as long as the SEW revisions differ significantly and match distinct EW revisions (i.e., Levenshtein similarity≤0.3). FIG. 3 depicts an example where the SEW page has multiple revisions that match with revisions in the corresponding EW page (e.g., the connections 310 and 320 indicating matching of revisions in FIG. 3)

Referring to FIG. 1, in some embodiments, the alignment model 102 may comprise manual revision matching for a portion of the dataset 110, depending on the dataset's size. Manual annotation may be done on 2,000 revision pairs with a binary alignment label. Sentence-level alignment has shown a relationship between content alignment and shallow string alignment (such as Levenshtein distance). To determine whether string-alignment methods are adequate for document-level alignment, samples were annotated across the entire range of string-alignment similarities, annotating 200 document pairs in each 0.1 range of Levenshtein ratio between [0,1.0]. Based on the findings, the NLI-based SummaC model is selected as the alignment model. The NLI-based SummaC model achieved a strong performance of 91.5 recall and 84.2 F-1 on a held-out test set.

Revision pairs may be annotated manually with binary Aligned/Unaligned labels. A document pair may be assigned the Aligned label if all the information in the SEW document was mentioned in the EW document, or if any new information can be seen as a useful addition for the purpose of simplifying information present both in the SEW and EW pages. A common reason for a document pair to be marked as Unaligned is when the SEW document contains additional sentences or paragraphs that provide information that does not directly assist the information on the EW page.

The annotated revision pair data may be randomly split into training, validation, and testing splits (1400-300-300 examples). A plurality of zero-shot and supervised methods may be considered for the task of page-pair alignment prediction, described below. For models that predict real-valued scores, a threshold may be selected based on the best validation performance.

Figure 2:
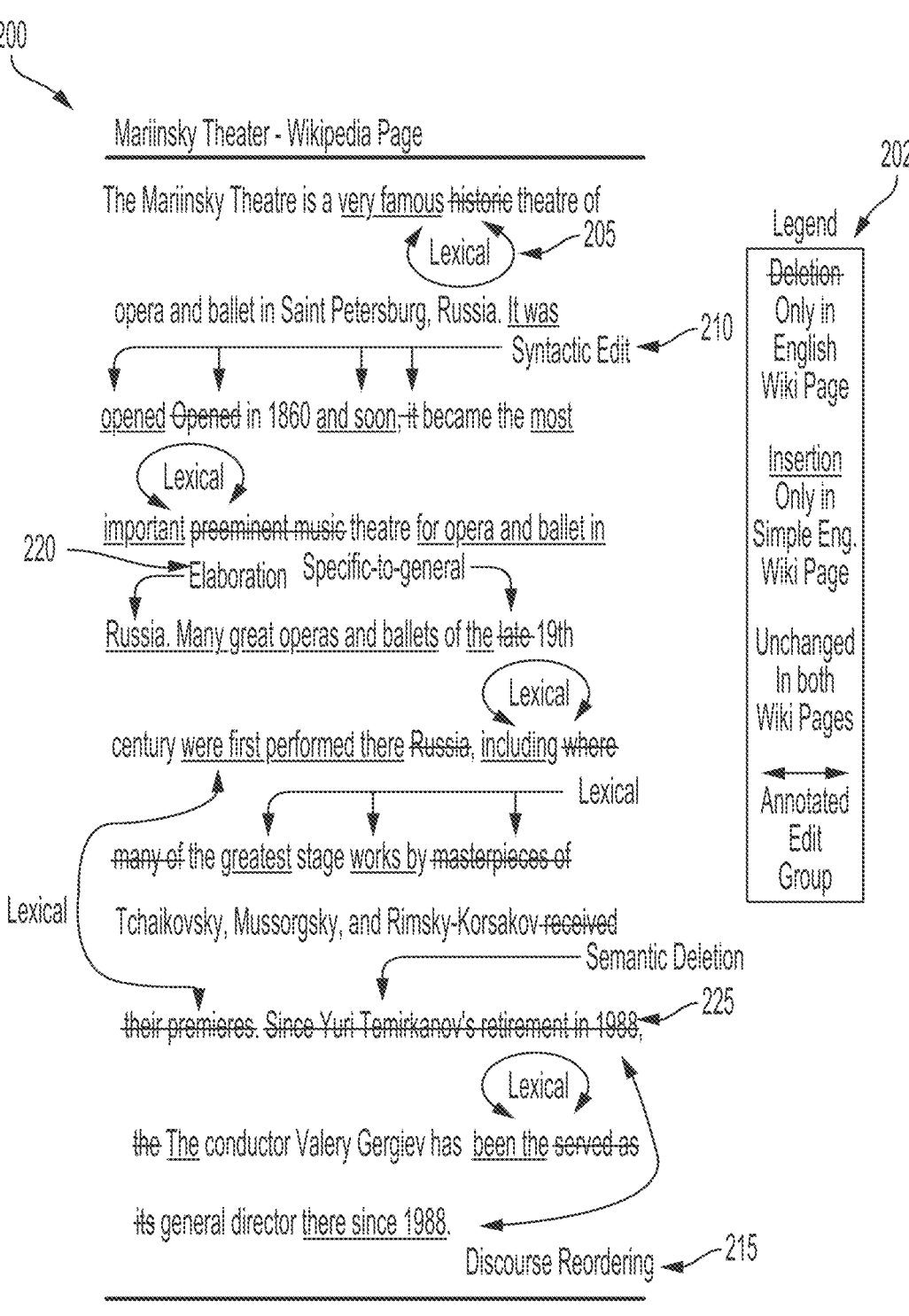
FIG. 2 is a simplified diagram illustrating matched and annotated revisions, according to some embodiments.

In one embodiment, SEW revisions may match none of the paired EW revisions if the SummaC model predicts that all pairs are unaligned. This occurs frequently, for example when a SEW page is written without being based on the relevant EW page. In total, matches occur for 133,744 page pairs, leading to a total of 145,161 revision-pair matches. FIGS. 2-3 and accompanying description, below, further describe revision matching and alignment.

Referring to FIG. 1, the edit identification model 104 may annotate matched revisions with a label indicating an edit category that the revisions belong to.

The term "document" refers to a particular page version. Given two matched documents, they can be represented as a single alignment sequence using a string-alignment algorithm such as Levenshtein. An alignment sequence consists of a series of three operations: unchanged text, inserted text (e.g., underlined text in FIG. 2), and removed text (e.g., text with strikethrough in FIG. 2), as illustrated in FIG. 2.

The annotation procedure of a document pair may consist of selecting groups of edit operations (i.e., insertions and deletions) and assigning them to an edit category from a predefined list. A document pair is considered fully annotated once each edit operation is assigned to at least one edit group.

Edit groups can consist of a single edit operation (e.g., 220, the Background Elaboration in FIG. 2), or multiple operations (e.g., 210, the four operations for the syntactic edit in FIG. 2). Operations can be part of multiple groups, which enables group overlap (e.g., 225, the second to last deletion in FIG. 2 is part of Semantic Deletion and Discourse Reordering groups).

Each operation may be treated as atomic-manual annotations do not further split edit operations. This sets a common ground for annotation, as work in extractive QA has shown that disagreement of span boundaries affects dataset quality.

After edit categories are chosen, manual annotators may iteratively annotate common samples in batches of 10-20 and introduced new categories specific to document-level simplification that did not arise in sentence-level-based work. Inter-annotator agreement may be measured at each iteration using Fleiss' Kappa and halted once no new category was introduced and the agreement level was above 0.7.

Edits can be attributed to one of four high-level goals: (1) Lexical edits are focused on simplifying word units, replacing rare/technical terms—a single word or a phrase—with simpler/more familiar terms; (2) Syntactic edits are focused on simplifying sentence units, simplifying the structure of a sentence, for example shortening sentences, or reordering clauses within a sentence; (3) Discourse edits deal with multi-sentence-level understanding, for instance by making connections between sentences more explicit, or reordering content so that required information appears before advanced information; (4) Semantic edits deal with the addition or removal of information to improve readability at the document level, for example through the deletion of information that is not needed for a preliminary understanding of a document, or elaborations that introduce needed background or practical examples to help a broader audience understand the document edits are focused on simplifying word units, replacing rare/technical terms—a single word or a phrase—with simpler/more familiar terms. Each class is subdivided into categories, for a total of 19 categories. For example, the Syntactic class contains Sentence Splitting, Sentence Fusion, Syntactic Deletion, and Syntactic Generic. The following discussion provides definitions for goals and categories of edits.

Any edit that does not fit any of the primary simplification goals is categorized as a Non-simplification. Other edits are typically artifacts of the dataset, for example, a fact correction in Wikipedia revisions, or format cleaning (change of spelling or capitalization). Specific edit definitions are listed next.

Lexical Edits

Lexical-Entity: Any edit that specifically targets the simplification of an entity (person, organization, location) for example the removal of a person's middle name, or the replacement of a scientific name with a common name.

Lexical: Any edit that replaces a complex or technical word or phrase with a more common/simple/accessible word or phrase. If the target phrase is a named entity, then the edit should be labeled with the more specific Lexical-Entity.

Syntactic Edits

Sentence Split: An edit that leads to a single sentence being divided into two or more shorter sentences. In order for the split to be fluent, words are typically removed and inserted at the sentence boundary. If non-connector content is added, then it is not only a sentence split.

Sentence Fusion: An edit that leads to several (two or more) sentences being merged into a single (potentially longer) sentence. Content is typically removed from original sentences to join the sentences fluently.

Syntactic Deletion: An edit that deletes words in a sentence with the primary objective of compressing the sentence but does not re-move information. If information is removed, then see Semantic-Deletion, below.

Syntactic Generic: An edit that modifies the syntax of the sentence, for example through re-ordering of clauses or changing verb tense.

Discourse Edits

Reordering: An edit (or typically several edits) that re-orders content to improve narrative flow, for example moving up background content to ease comprehension. The re-ordering can happen within a single sentence, or across multiple sentences.

Anaphora Resolution: An edit that replaces the repeated or implicit mention of an entity-typically a pronoun-with a resolved mention of the entity (i.e., that doesn't require prior context).

Anaphora Insertion: An edit that replaces an explicit mention of an entity with an indirect mention, such as a pronoun. The pronoun is typically a short common, which can reduce sentence complexity by decreasing length and word complexity. This is the inverse of the Anaphora Resolution edit.

Semantic Edits

Specific-to-General: An edit that substitutes or removes low-level detail in exchange for a higher-level description (like replacing a city with its country). The detail deletion typically is judged as not essential and can be replaced by the higher-level portion. There must be a high-level content addition, otherwise, if it is only deletion, it is likely a Semantic-Deletion.

Elaboration—Background: An edit that inserts content—a phrase or a full sentence-adding pre-requisite information for related content in the document. Typically, the background is inserted before the content it supplements.

Elaboration—Example: An edit that inserts a concrete example of an abstract concept or phenomenon described in the document. Typically, the example is inserted after the content it concretizes.

Elaboration—Generic: Any edit that adds information but cannot be categorized as a "Background" or "Example" elaboration. The insertion can be a phrase or a full sentence.

Semantic—Deletion: An edit that removes content from the original document, typically because it is not essential to a simple comprehension of the document. The deletion can remove a part of a sentence or an entire sentence. Note that there can be many deletions within a single document, particularly when the original document is lengthy.

Non-Simplification Edits

Format: An edit that modifies solely the for-matting of the document, including punctuation, capitalization, spelling (for example UK to US spelling), or entity format (such as a date).

Noise Deletion: An edit that fixes noisy content in the original document, such as a trailing partial sentence, or Wikipedia-specific formatting and jargon.

Fact Correction: An edit that corrects a specific fact in the original document, most often updating the recency of the fact.

Extraneous Information: Any edit that introduces facts that are not meant to simplify or add context to the information already present. Typically adds related but secondary information that is not needed in the simplified text. The insertion could be within a sentence or an entire sentence.

NonSim-General: Any other edit that does not contribute to (Lexical, Syntactic, Discourse, Semantic) simplification, but does not fit in any other category.

The input to the edit identification task may be a document pair's (e.g., original text and simplified text) alignment sequence, which is composed of a series of edit operations (see e.g., FIG. 2 without the edit labels); the task is to group (potentially overlapping) edit operations and assign each group to an edit category, matching the format of the annotations. Automatic edit annotation using the edit identification model 104 is further described with respect to, and depicted in, FIGS. 4A-4C, below.

FIG. 2 is a simplified diagram illustrating a diagram 200 of a plurality of matched and annotated revisions for a pair of Wikipedia pages according to some embodiments. Diagram 200 shows both the English Wikipedia (EW) page and the Simplified English Wikipedia (SEW) page for the "Mariinsky Theatre." The Legend 202 depicts how to recover either the EW page or the SEW page. The EW is the text of diagram 200 with the underlined text removed (i.e., the underlined text is text that was inserted into the EW to create the SEW for a particular version of the pages). The SEW is the text of diagram 200 with the strikethrough text removed (i.e., the strikethrough text is text that was removed from the EW to create the SEW for a particular version of the pages).

Diagram 200 shows a plurality of examples of matched revisions. For example, lexical revision 205 shows that "historic" was removed from the EW page and "very famous" was inserted. An arrow joins these two revisions, indicating they are matched, because "very famous" may be a simpler way of saying "historic." In other words, "very famous" may be more comprehensible to a person less familiar with the English language, e.g., a non-native speaker, than "historic." In another example, syntactic revision 210 changes "Opened in 1860, it became . . . " in the EW page to "It was opened in 1860 and soon became . . . " in the SEW page. The syntactic revision 210 changes the sentence structure to inform the reader earlier in the sentence what "opened in 1860," eliminating the more abstract sentence structure using an introductory phrase in the EW page. In another example, the "Discourse Reordering" revision 215 and "Semantic Deletion" revision 220 area hybrid revision, combining two different types. The "Discourse Reordering" revision 215 moves the time reference to the end of the sentence, while the "Semantic Deletion" revision 220 removes the extra information about "Yuri Temirkanov's retirement."

FIG. 3 is a simplified diagram 300 illustrating matched revision histories according to some embodiments. Diagram 300 depict a page revision history 302 corresponding to an original passage such as the English Wiki Page text in FIG. 2 and a simplified page revision history 304 corresponding to a simplified passage such as the Simple Eng. Wiki Page text in FIG. 2. Points along the revision histories 302, 304 indicate times when revisions were made to the respective pages associated with the timeline. Time increases to the right on FIG. 3, with year markers, i.e., 2016, 2018, 2020, and 2022, depicted along the bottom of the figure.

In some embodiments, the page revision history 302 may be the revision history for revisions of an EW page, and the simplified page revision history 304 may be the timeline for revisions of a SEW page.

A connection between points on the two timelines 302 and 304 indicate a matched revision between the two pages. Revisions are matched when they comprise the same edit. For example, the word "contemporaneously" might have been deleted in the original text while the phrase "at the same time" is inserted into the simplified text. In this example, "at the same time" is a simpler way of saying "contemporaneously." As depicted, for example, revision 312 and revision 314 are matched revisions and the match is indicated by the connection 310. Similarly, as depicted, revision 322 and revision 324 are matched and the match is indicated by connection 320. The final matching revisions, revision 332 and 334 are matched and indicated by connection 330. The following description describes in further detail the page matching, revision matching, and edit annotation tasks. Some of these tasks may be partially completed by humans as a baseline. As described herein the matching of revisions may occur across the entire revision history of the pages, whereas previous work had only matched the latest in time revisions, e.g., 330.

Figure 4A:
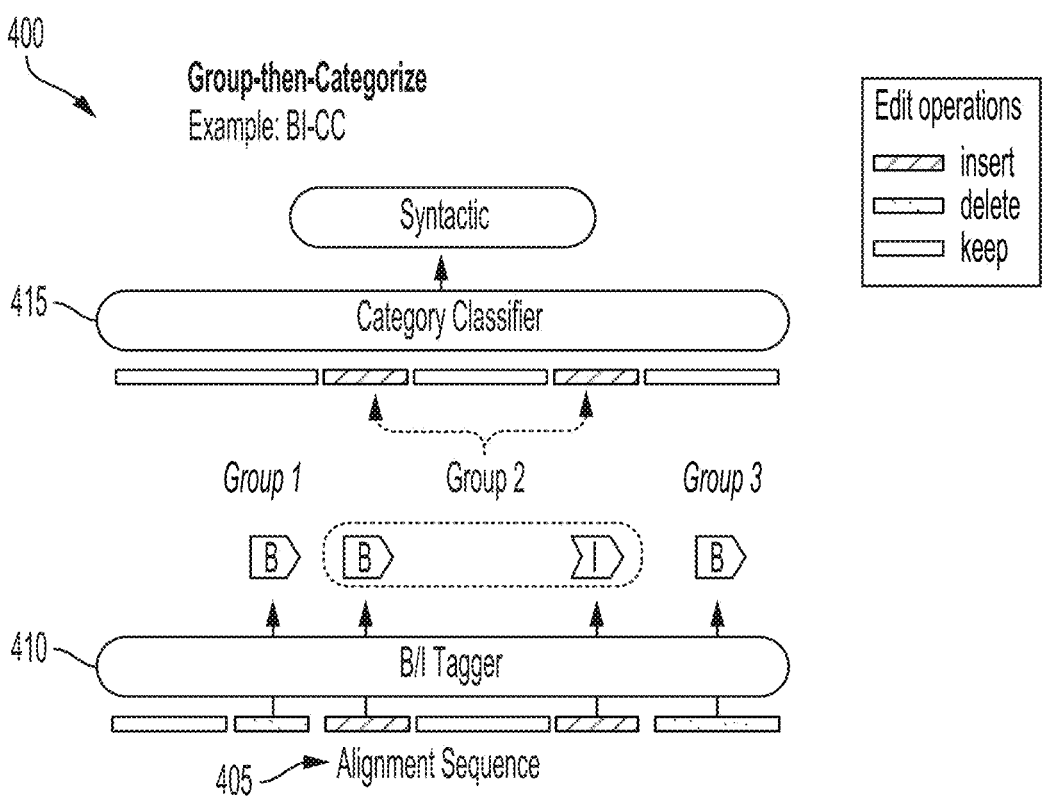
FIG. 4A is a simplified diagram illustrating a first edit identification model, according to some embodiments.
Figure 4B:
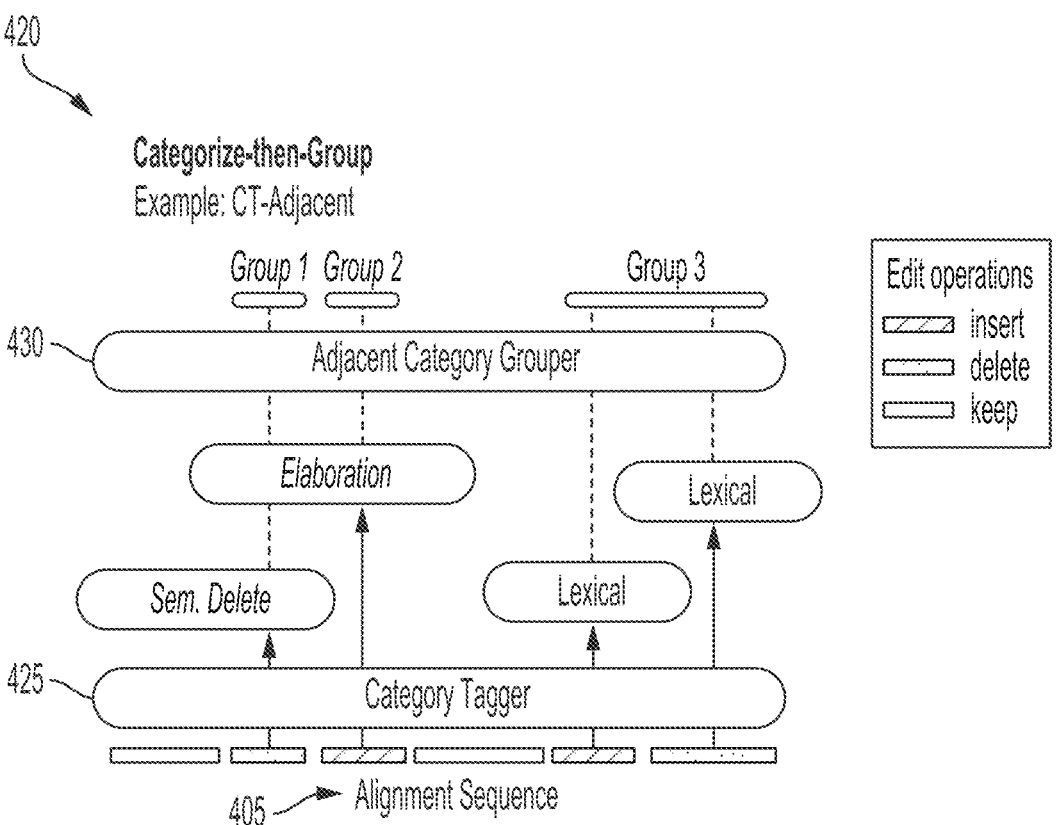
FIG. 4B is a simplified diagram illustrating a second edit identification model, according to some embodiments.
Figure 4C:
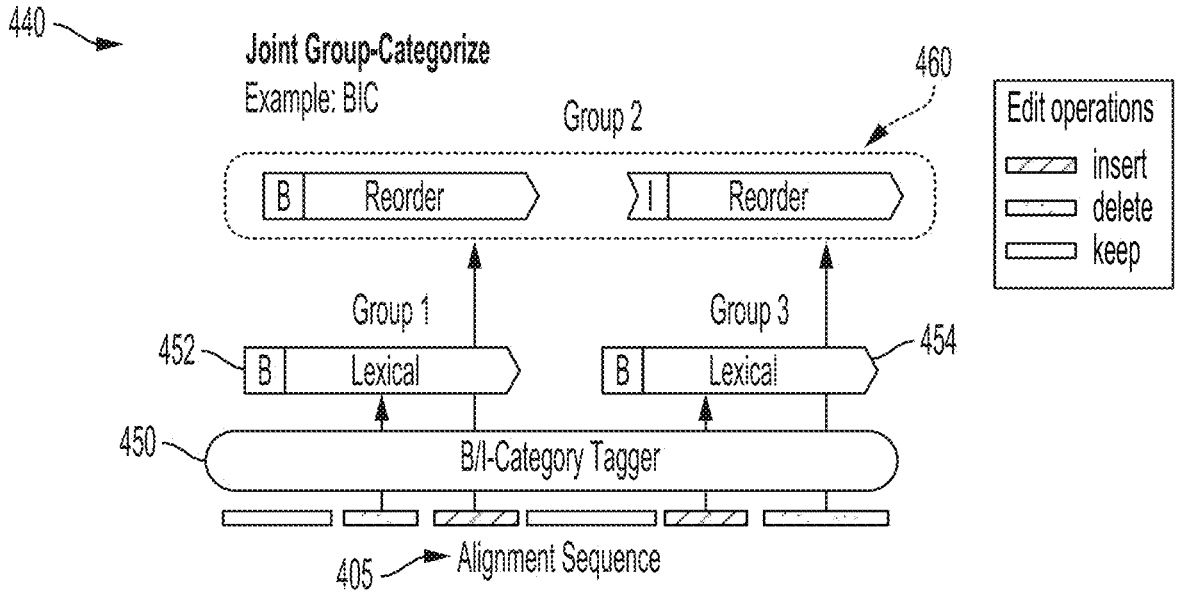
FIG. 4C is a simplified diagram illustrating a third edit identification model, according to some embodiments.

Three varieties of edit identification models 104 are described with respect to, and illustrated in, FIGS. 4A-4C.

The Group-then-Categorize approach uses an initial grouper model (e.g., 410) to propose category-agnostic edit groups, and a second classification model (e.g., 415) to assign a category to each group. Three grouper models may be considered. The oracle grouper uses the groups available in the annotations. The adjacency grouper applies the heuristic that adjacent edit operations (with no unchanged text between them) are within the same group. The BI grouper 410 is a learned sequence-tagging model that segments edit operations into groups by outputting B (Beginning of group) or/(Inside of group) for each edit operation. In the next stage, each predicted group is passed to the Category Classification (CC) model 415; the input group is represented as an adjusted alignment sequence in which only the edit operations of the group are included. The three variants of this two-stage pipeline are referred to as Oracle-CC, Adjacent-CC, and BI-CC.

In some embodiments, the Category Classification (CC) model 415, used in the Adjacent-CC, BI-CC, and Oracle-CC pipeline approaches may be implemented as a finetuned ROBERTa-large model with a sequence classification head (i.e., a model that generates a single pre-diction for the entire sequence). The model is trained on a processed version of the training portion of SWIPE, in which each document pair is leveraged to create several samples, each based on a single group in the annotations. For each new sample, an adjusted alignment sequence is created by reverting all edit operations that are not part of the sample's considered group. The model receives the adjusted alignment sequence and must predict the category of the represented edit. The CC model is configured to see a single category per input alignment sequence and does not consider overlapping and multi-category edits. The model used in experiments may be trained with a batch size of 16, Apex half-precision, for seven epochs at a learning rate of 10E-5. The best checkpoint based on validation F-1 may be selected, achieving a validation F-1 score of 77.5. There is a crucial mismatch between train and prediction time in CC-based pipelines, as the CC model is trained on oracle groups, and at prediction time, certain configurations provide the model with imperfect groups (such as the Adjacent and BI groupers), which likely negatively affects performance. The training of the final model takes roughly 1 hour on a single A100 GPU, and roughly 50 runs were conducted in iterations of model training.

The BI model 410, used in the grouping stage of the BI-CC model 400 is a ROBERTa-large sequence tagging model that receives as input an alignment sequence and must predict for each edit operation whether the operation is at the beginning of (B) or inside (I) an edit group. An XML-like language may represent the alignment sequence for the model, using two operation starts (<insert> and <delete>) and two operation ends (</insert> and </delete>) which may be added as special tokens to the model's vocabulary. The model may be trained to generate each operation's binary B/I tag at the corresponding beginning delimiter token. The model may be trained using half-precision, and a learning rate of 10E-5 for 10 epochs, selecting the model with the highest F-1 binary accuracy on the validation set of SWIPE. The training of the final model took roughly 25 minutes on a single A100 GPU, and roughly 20 training runs were conducted in iterations of model training.

The Categorize-then-Group approach first predicts the category of each edit operation and then groups operations based on the predicted categories (e.g., as depicted in FIG. 4B). For the first stage, Category Tagger (CT) 425, an NER-style sequence tagging model that takes as input a formatted alignment sequence and predicts one or more categories for each edit operation, may be used. For the second stage, three grouper models may be considered: the single grouper performs no grouping, the adjacent grouper 430 bundles adjacent edit operations of the same category, and the rules grouper applies category-specific rules. By combining the stages, we obtain CT-single, CT-adjacent 420, and CT-rules.

The Category Tagging (CT) model 425, used in the first stage of the CT-Single, CT-Adjacent, and CT-Rules models, The BIC model uses an identical model architecture to the CT model described above, but expands the label space from 19 category labels to 57 joint category-BI labels. Specifically, for each category label <cat>, two additional labels are considered: <cat-B> and <cat-I>, indicating whether the operation is at the beginning or end of a group of this category, respectively. At training time, an edit operation is tagged with <cat> if the category is present and additionally with either <cat-B> or <cat-I> according to the operation's position within the annotated group. At inference time, the model outputs one or more of the 57 joint labels at each edit operation's start token. If<cat> is predicted for a given category, then the associated BI label is chosen based on whether <cat-B> or <cat-I> has the higher predicted probability. For training, a batch size of 8 and a learning rate of 10E-5 for 10 epochs may be used. The model checkpoint may be selected based on validation-set performance. The training of the final model took approximately 20 minutes on a single A100 GPU, and roughly 15 training runs were conducted in iterations of model training.

The Seq2seq model may be implemented based on a BART-large model that is fine-tuned on a seq2seq task using an XML representation of the alignment sequence. Example processing of the illustrative FIG. 2 would be:

---

Input: "The Mariinsky Theater is a <INS>very famous</INS> <DEL>historic</DEL> theater of opera and balet ..."
  Output: "The Mariinsky Theater is a <B;lexical>very famous</INS> <I;lexical>historic</DEL> theater of opera and balet ..."

--- follows a similar architecture as the BI model described above, but outputs one of the 19 simplification categories for each edit operation instead of a B/I indicator. Additionally, CT uses a multi-label token-classification head to handle the case of multiple categories for an edit operation (e.g., for overlapping edit groups). For training, a batch size of 8 and a learning rate of 10E-5 for 10 epochs may be used. The final checkpoint may be selected based on validation-set performance. The training of the final model takes approximately 20 minutes on a single A100 GPU, and roughly 10 training runs were conducted in iterations of model training.

The Rules grouping method used in the second stage of the CT-Rules model, relied on category-specific statistics in the training portion of SWIPE. Categories may be split into two sub-groups: contiguous and global. For each category, the percentage of annotated of edits of the given category that were contiguous (adjacent) in their operation group may be analyzed. For each edit category, if a majority of annotated cases are contiguous, the edit category may be labeled as contiguous, otherwise, it may be labeled as global. For categories marked as contiguous, the model generated groups for predicted operation types based on contiguous boundaries (identical to the Adjacent grouping method), and all operations of a given global category may be organized into a single group.

In addition to two-stage models, two joint models that simultaneously group and categorize edit operations may be implemented. BIC (440 in FIG. 4C) is a sequence tagger that combines the label space of the BI and Category taggers; for each edit operation, BIC outputs one or more categories (e.g., 452, 454, 460), each paired with a BI indicator for segmenting groups within that category. This category-specific BI notation supports richer forms of groupings, e.g., interleaved groups as illustrated in FIG. 4C by Group 3 454 and Group 2 460.

As illustrated in the example, the model was trained to replace generic operation beginning tags with a joint tag representing the category and the BI tag of the operation. The vocabulary of the model was expanded to include the 38 tokens representing all combinations of (category x (B,I)) tags. The model was trained on the preprocessed data following a standard sequence-to-sequence formulation, with a batch size of 6, a learning rate of 2*10E-5, for ten epochs, and the model with the lowest validation loss was selected as a final model. Training of the final model required roughly one hour of training, and roughly 20 training runs were conducted in iterations of model training. The Seq2seq model is a fine-tuned sequence-to-sequence model that takes as input an XML-formatted alignment sequence and outputs an expanded XML in which edit categories and groups are identified. With all of the above models, we use ROBERTa-large (Liu et al., 2019) and BART-Large (Lewis et al., 2020) models for NLU and NLG components, respectively.

The Op Majority baseline predicts the majority class for each operation type: Semantic Deletion for delete operations (54% of all deletions), and Lexical for insert operations (20% of all insertions).

In some embodiments, the BIC model may be used to automatically annotate all documents in SWIPE, identifying over one million edits, including more than 90,000 elaborations. SWIPE may be refined into a cleaned version by automatically reversing edits tagged in the Non-Simplification class.

Computer and Network Environment

Figure 5A:
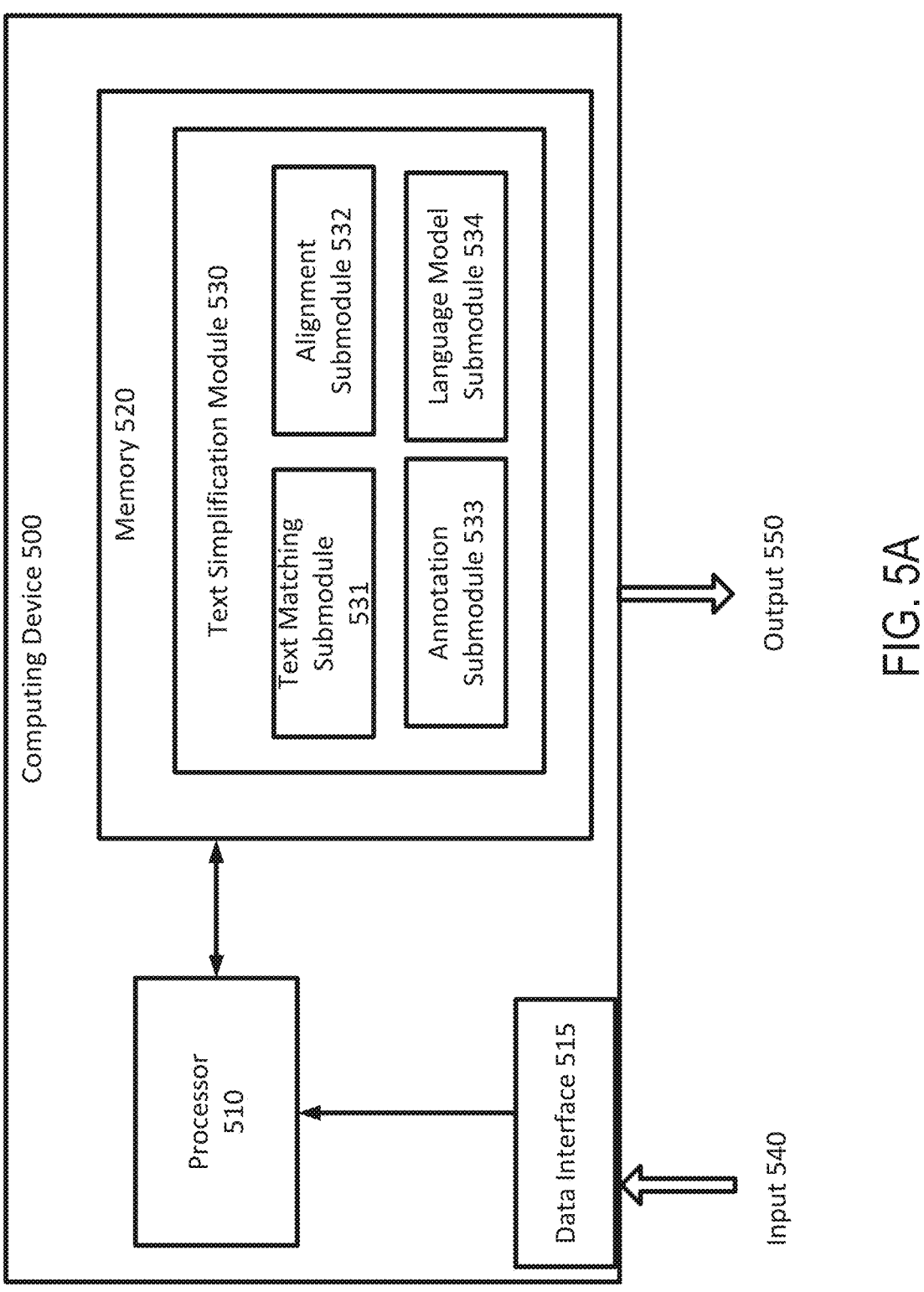
FIG. 5A is a simplified diagram illustrating a computing device implementing the text simplification framework described in FIGS. 1-4, according to some embodiments.

FIG. 5A is a simplified diagram illustrating a computing device implementing the text simplification framework described in FIGS. 1-4, according to one embodiment described herein. As shown in FIG. 5A, computing device 500 includes a processor 510 coupled to memory 520.

Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for Text Simplification module 530 that may be used to implement and/or emulate the systems and models, and/or to implement any of the methods described further herein. Text Simplification module 530 may receive input 540 such as an input training data (e.g., document pairs or alignment sequences) via the data interface 515 and generate an output 550 which may be simplified versions of a document.

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as textual documents from a user via the user interface.

In some embodiments, the Text Simplification module 530 is configured to generate a document that is simpler than an input document. The Text Simplification module 530 may further include Text Matching submodule 531 (e.g., similar to 300 in FIG. 3), Alignment submodule 532 (e.g., similar to 310 in FIG. 3), Annotation submodule 533 (e.g., similar to 440 in FIG. 4C), and Language Model submodule 534. Text Matching submodule 531 may be configured to match the pages of original and simplified documents. Alignment submodule 532 may be configured to generate an alignment sequence when a revision in the original and simplified document are aligned. Annotation submodule 533 may be configured to annotate an identified edit with a category label. Large Language Model submodule 534 may assist in the annotation task (e.g., 440 in FIG. 4C).

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5B:
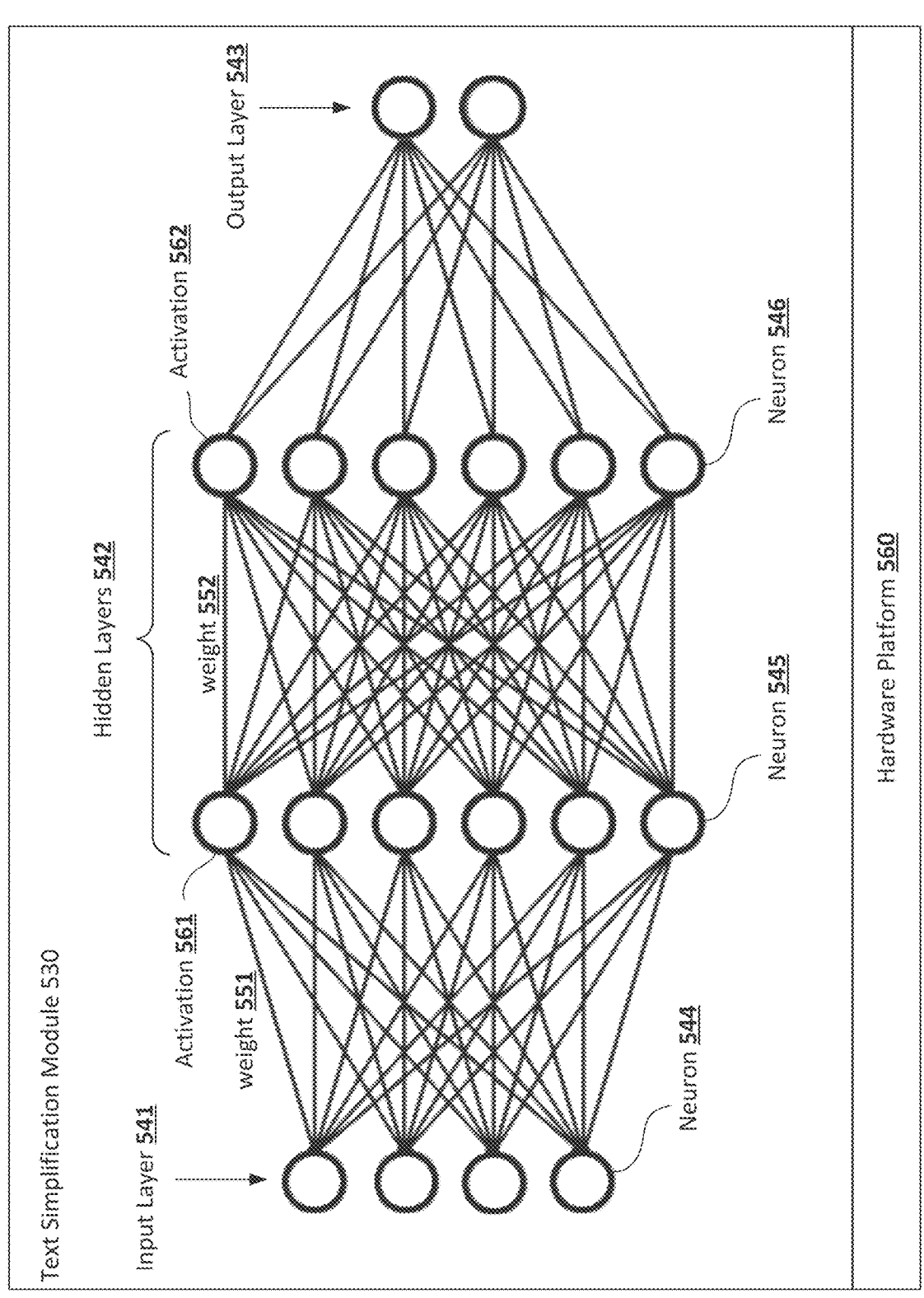
FIG. 5B is a simplified diagram illustrating a neural network structure, according to some embodiments.

FIG. 5B is a simplified diagram illustrating the neural network structure implementing the Text Simplification module 530 described in FIG. 5A, according to some embodiments. In some embodiments, the Text Simplification module 530 and/or one or more of its submodules 531-534 may be implemented at least partially via an artificial neural network structure shown in FIG. 5B. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data (e.g., 540 in FIG. 5A), such as an original textual document. The number of nodes (neurons) in the input layer 541 may be determined by the dimensionality of the input data (e.g., the length of a vector representing the input original textual document). Each node in the input layer represents a feature or attribute of the input.

The hidden layers 542 are intermediate layers between the input and output layers of a neural network. It is noted that two hidden layers 542 are shown in FIG. 5B for illustrative purpose only, and any number of hidden layers may be utilized in a neural network structure. Hidden layers 542 may extract and transform the input data through a series of weighted computations and activation functions.

For example, as discussed in FIG. 5A, the Text Simplification module 530 receives an input 540 of textual document and transforms the input into an output 550 of a simplified textual document. To perform the transformation, each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the Text Simplification module 530 and/or one or more of its submodules 531-534 may comprise the transformative neural network structure of layers of neurons, and weights and activation functions describing the non-linear transformation at each neuron. Such a neural network structure is often implemented on one or more hardware processors 510, such as a graphics processing unit (GPU). An example neural network may be a transformer neural network], and/or the like.

In one embodiment, the Text Simplification module 530 and its submodules 531-534 may be implemented by hardware, software and/or a combination thereof. For example, the Text Simplification module 530 and its submodules 531-534 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based Text Simplification module 530 and one or more of its submodules 531-534 may be trained by iteratively updating the underlying parameters (e.g., weights 551, 552, etc., bias parameters and/or coefficients in the activation functions 561, 562 associated with neurons) of the neural network based on a loss, such as the cross-entropy. For example, during forward propagation, the training data such as a textual document are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding human-annotated edit for a simplified document) from the training data, to compute a loss function that measures the discrepancy between the predicted output and the expected output. For example, the loss function may be cross entropy or MMSE. Given the loss, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as transforming a textual document into a simplified document.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in text simplification.

Figure 6:
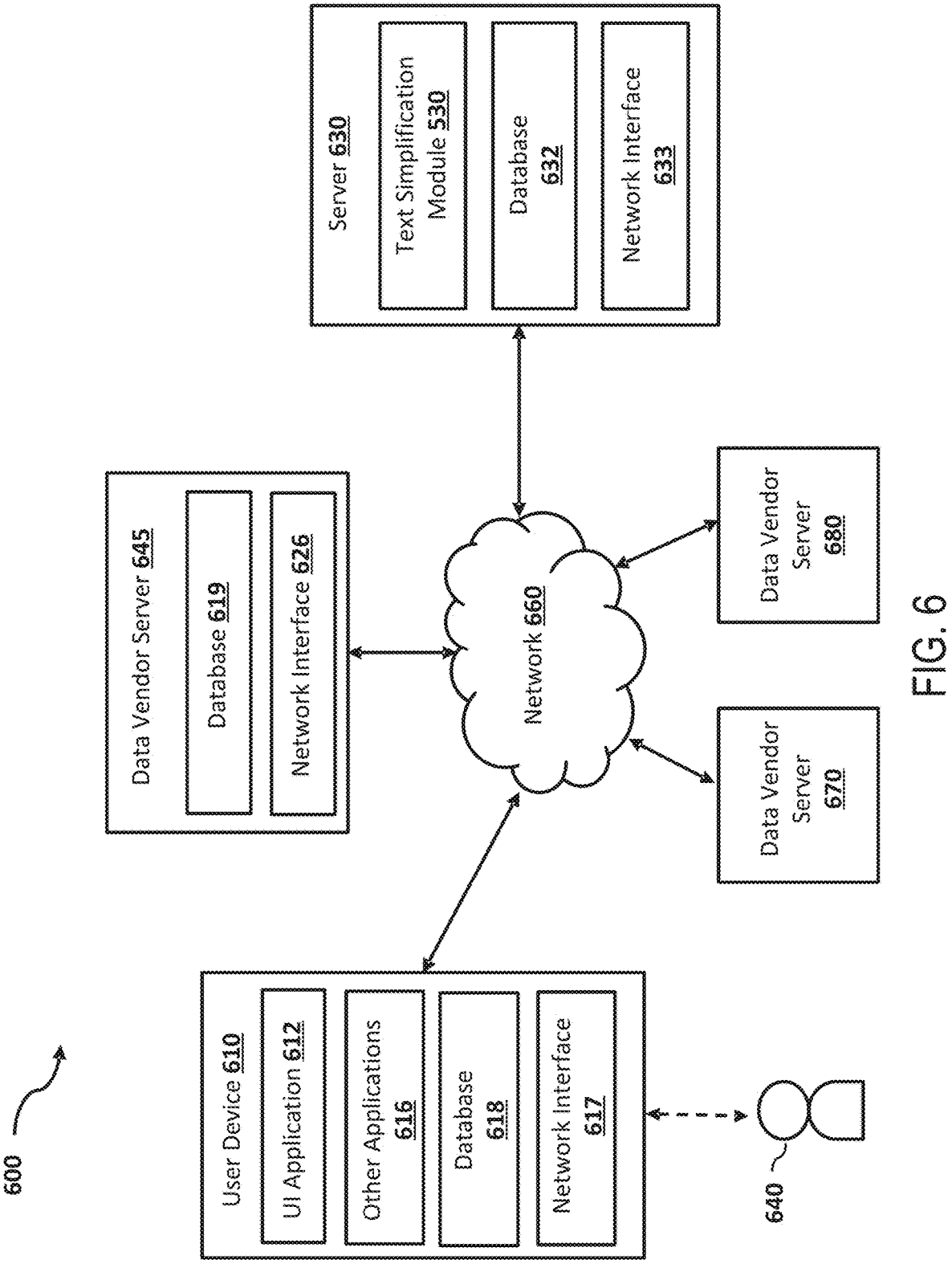
FIG. 6 is a simplified block diagram of a networked system suitable for implementing the text simplification framework described in FIGS. 1-4 and other embodiments described herein.

FIG. 6 is a simplified block diagram of a networked system 600 suitable for implementing the text simplification framework described in FIGS. 1-4 and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 500 described in FIG. 5A, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating a textual document has been simplified, or the message may be the text of the simplified document, from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view simplified textual documents.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like.

In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including document pairs (e.g., a textual document and its simplified version) to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the Text Simplification module 530 and its submodules described in FIG. 5A. In some implementations, Text Simplification module 530 may receive data from database 619 at the data vendor server 645 via the network 660 to generate simplified textual documents. The generated simplified textual documents may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the Text Simplification module 530. In one implementation, the database 632 may store previously generated simplified textual documents and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flows

FIG. 7 is an example logic flow diagram illustrating a method of text simplification based on the framework shown in FIGS. 1-4, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the Text Simplification module 530 (e.g., FIGS. 5A and 6) that performs text simplification, edit annotation, and other tasks as described herein.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, a training dataset including a first set of original textual samples (e.g., the EW pages described above) and original revision histories (e.g., 302 in FIG. 3) of original textual samples and a second set of simplified textual samples (e.g., the SEW pages as described above) and simplified revision histories (e.g., 304 of FIG. 3) of simplified textual samples are received via a data interface (e.g., 515 in FIG. 5A), wherein each original textual sample and each simplified textual sample has a corresponding revision history.

At step 704, a training pair (e.g., the two different documents represented in FIG. 2) including an original textual sample (e.g., the EW pages as described above) and corresponding original revision history (e.g., 302 in FIG. 3) from the first set and a counterpart simplified textual sample (e.g., the SEW pages as described above) and corresponding simplified revision history (e.g., 304 in FIG. 3) from the second set are identified (e.g., by processor 510 running text matching submodule 531 in FIG. 5A).

At step 706, an alignment label (e.g., as represented by 310 connecting revisions of the two different documents in FIG. 3) for a first revision (e.g., 314 in FIG. 3) in the corresponding original revision history (e.g., 302 in FIG. 3) and a second revision (e.g., 312 in FIG. 3) in the corresponding simplified revision history (e.g., 304 in FIG. 3) are generated via a neural network-based alignment model (e.g., as described above) implemented on one or more hardware processors from a score, and the score (e.g., the loss described above in connection with FIG. 5B) is based on the first revision (e.g., 314 in FIG. 3) and the second revision (e.g., 312 in FIG. 3).

At step 708, a revision category label (e.g., "Elaboration" 220 in FIG. 2) for each of the first revision and second revision is generated via a neural network-based classification model (e.g., as described above) implemented on one or more hardware processors. In some aspects, the revision category level may belong to one of the classes: lexical, syntactic, discourse, semantic, or non-simplification (as described above). In some aspects, steps 706 and 708 may occur concurrently (e.g., using multiple processors 510).

At step 710, an updated training dataset including the training pair (e.g., the two different documents represented in FIG. 2) is stored (e.g., in Memory 520 or various databases 618, 619, and 632). In some aspects, the training pair may be processed (e.g., following instruction in text simplification module 530) into an alignment sequence (e.g., 200 in FIG. 2), wherein the alignment sequence includes text found in both the original textual sample and the corresponding simplified textual sample, text only in the original textual sample, and text only in the corresponding simplified textual sample (e.g., as described in the Legend in FIG. 2 and associated description above). In some aspects, the alignment sequences may further include the alignment label and revision category label (e.g., 210 associating "Syntactic Edit" revisions in SEW and EW in FIG. 2).

At step 712, a neural network-based text simplification model based on the updated training dataset is trained (e.g., as described with respect to, and as depicted in, FIG. 5B). In some aspects, a predicted simplified document (e.g., as encoded in output layer 543 in FIG. 5B) may be generated from the original textual sample (e.g., as encoded in the input layer 541 in FIG. 5B) via the neural network-based text simplification model. In some aspects, a loss function (as described above with respect to FIG. 5) may be computed based on the predicted simplified document (e.g., as encoded in output layer 543 in FIG. 5B) and the corresponding simplified textual sample (e.g., the ground truth). In some aspects parameters (e.g., hidden layers 542 in FIG. 5B) may be updated (e.g., by the processor 510) based on the loss function via backpropagation (e.g., as described above with respect to FIG. 5B).

In some aspects, after training, the neural network-based text simplification model may be used for inference. For example, a first document may be received via a data interface (e.g., 515), a second document (e.g., as encoded by the output layer 543) may be generated from the first document using the neural network-based text simplification model (e.g., using a neural network depicted in FIG. 5B), and the second document may be outputted. In some aspects, a set of preferred edit types (e.g., a selection from the edit categories described above) may also be received with the first document. A second document can then be generated from the first document based on the preferred edit types.

Example Results

FIGS. 8-16 represent exemplary test results using embodiments described herein. SWIPE and its cleaned alternative are used to fine-tune two BART-large models: BART-SWIPE and BART-SWIPE-C. The BART-SWIPE and BART-SWIPE-C models were trained on the standard and cleaned versions of the SWIPE dataset, using a standard sequence-to-sequence framing, in which the model received the original document as an input, and was trained to generate the simplified document.

The models were trained with a learning rate of 2*10-5, a batch size of six for three epochs, and selected the final checkpoint based on validation loss, which reached 1.12 for BART-SWIPE and 0.78 for BART-SWIPE-C. Training required 6-10 hours for each model, on a single A-100 GPU, and 5 runs were completed in the development of the models. At generation time, beam search (beam size of 4) was used to generate candidate simplifications.

Datasets references in this disclosure are English Wikipedia and Simple English Wikipedia, as available at http://wikipedia.org and http://simple.wikipedia.org, and accessed using Wikidata; Wikilarge as described in Zhang and Lapata, Sentence simplification with deep reinforcement learning, in Proceedings of the 2017 Conference on Empirical Methods in Natural Language Processing, pp. 584-594.

The language models used are ROBERTa-large as described in Liu et al., Roberta: A robustly optimized bert pretraining approach, at arXiv: 1907.11692; BART-Large as described in Lewis et al., Bart: Denoising sequence-to-sequence pre-training for natural language generation, translation, and comprehension, in Proceedings of the 58th Annual Meeting of the Association for Computational Linguistics, pp. 7871-7880.

Models and baselines used are NLI-based SummaC as described in Laban et al., SummaC: Re-visiting NLI-based models for inconsistency detection in summarization, in Transactions of the Association for Computational Linguistics, 10:163-177; Levenshtein string-alignment algorithm as described in Levenshtein, Binary codes capable of correcting deletions, insertions and reversals, in Soviet Physics, pp. 707-710; ACCESS as described in Martin et al., Controllable sentence simplification, in Proceedings of the 12th Language Resources and Evaluation Conference, pp. 4689-4698; Keep It Simple (KIS) as described in Laban et al., Keep it simple: Unsupervised simplification of multi-paragraph text, in Proceedings of the 59th Annual Meeting of the Association for Computational Linguistics and the 11th International Joint Conference on Natural Language Processing, pp. 6365-6378; spaCy's NER as described in Honnibal et al., spaCy: Industrial-Strength Natural Language, 2020.

Scores/Metrics used are SARI as described in Xu et al., Optimizing statistical machine translation for text simplification, in Transactions of the Association for Computational Linguistics, pp. 401-415; Flesch-Kincaid Grade Level (FKGL) as described in Kincaid et al., Derivation of new readability formulas (automated readability index, fog count and flesch reading ease formula) for navy enlisted personnel. in Technical report, Naval Technical Training Command Millington TN Research Branch.

FIG. 8 is a table depicting the total number and relative frequencies of different edit categories for the five classes of edits. N is the number of annotated instances, %∃ is the percentage of documents with the edit, #O is the average group size, and % I, % D, % I+D is are the distribution of insert-only, delete-only, and replace operations.

FIG. 9 is a table summarizing the number of documents in each portion of the dataset. Silver Annotated data was produced automatically using the BIC model described above with respect to FIG. 4C. OOD refers to documents from categories that were out-of-domain. To inspect annotation quality, 329 alignment sequences were annotated by several annotators. The agreement level is measured using Fleiss' Kappa and averages 0.62 for the five category classes, indicating moderate agreement. Wikipedia categories are assigned to pages that identify page themes (e.g., Technology). In total, 71,705 Wikipedia categories appear in SWIPE. Three categories—Materials, Economics, and Desserts—containing 377 pairs, which were annotated as a more challenging out-of-domain (OOD) test set. The rest of the annotation was performed on a random sample of all other categories.

Figures 10A, 10B:
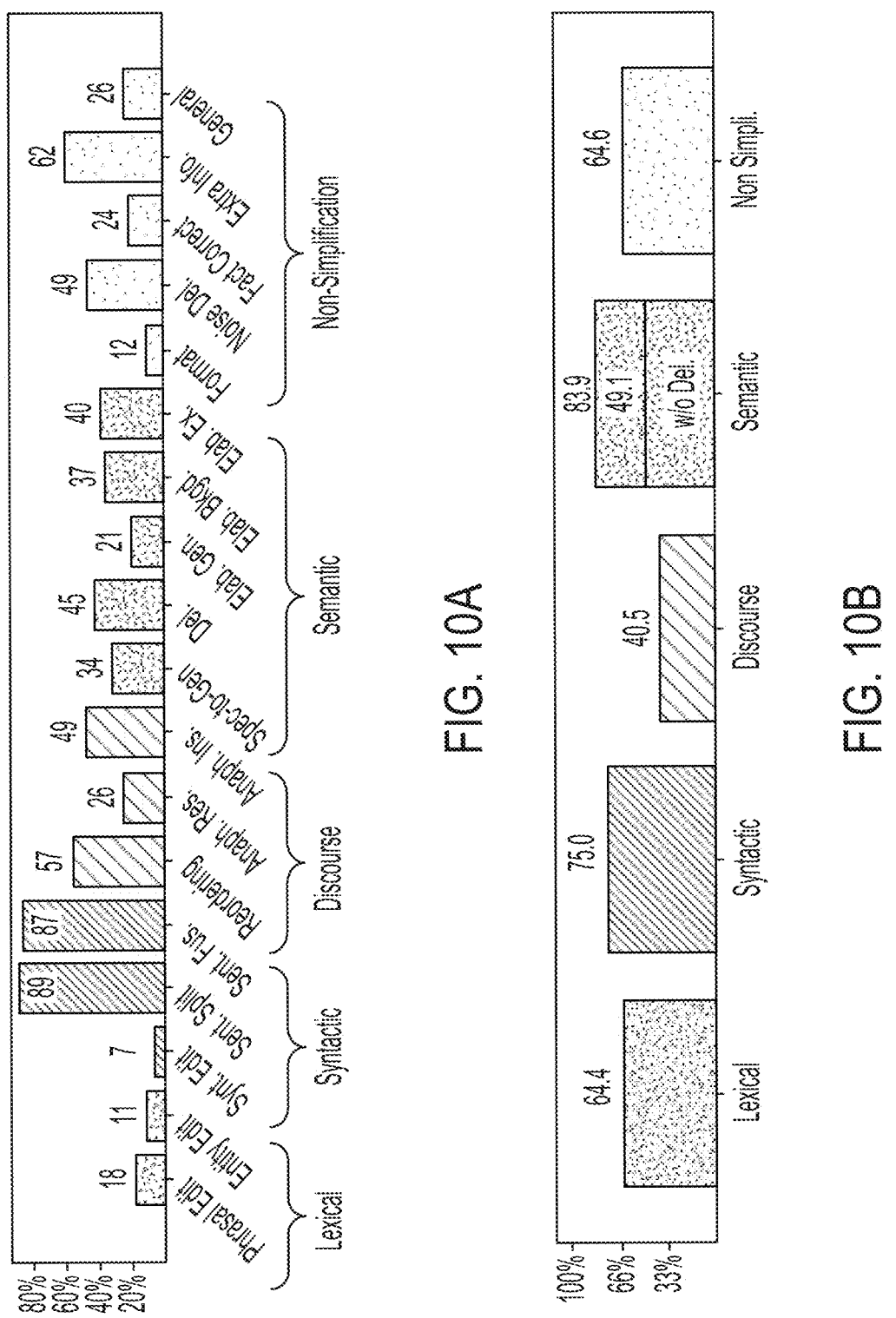

FIG. 10A is a graph depicting the percentage of each edit category that cross sentence boundaries.

FIG. 10B is a graph of the percentage of documents that include edits from each group of edit categories.

Figures 10C, 10D:
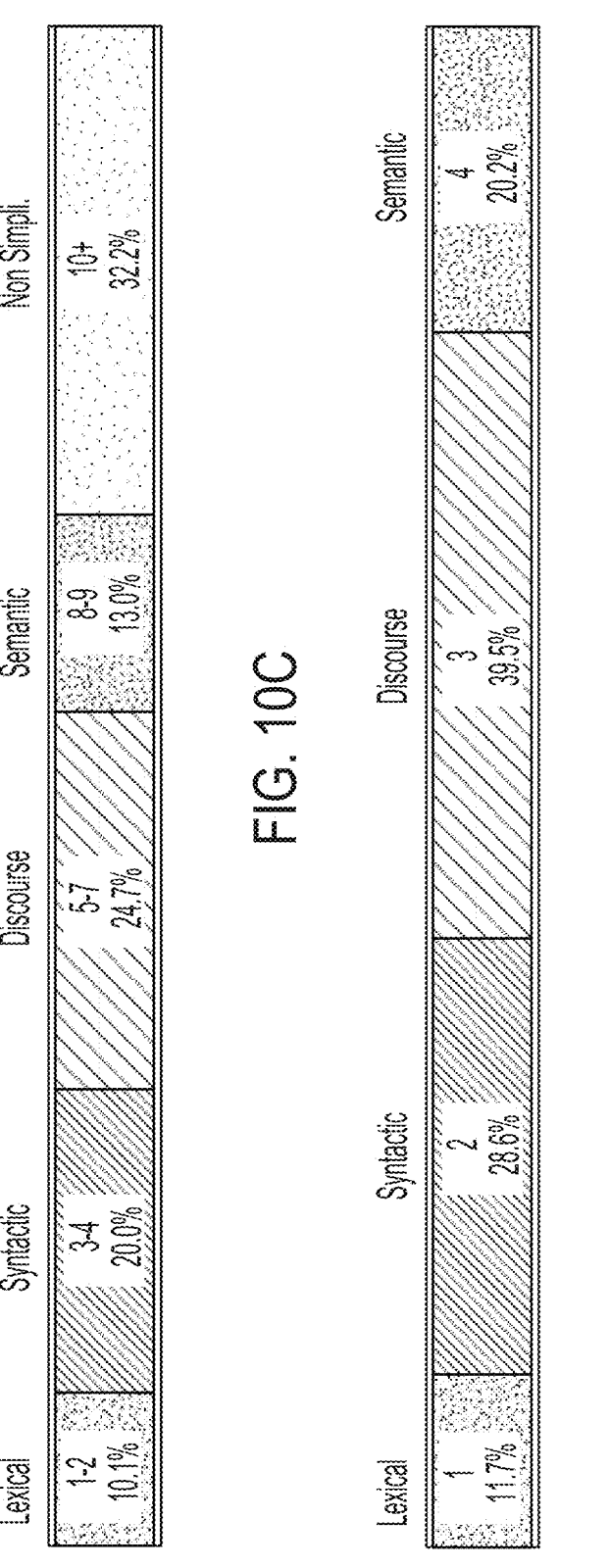

FIG. 10C is a graph of the distribution of the number of edits per document.

FIG. 10D is a graph of the distribution of distinct category classes within documents.

FIG. 11 is a table of the edit identification results on the in-domain test set for various annotation models (e.g., 400, 420, and 440 as described with respect to, and depicted in, FIGS. 4A-4C). Cat F1 and Class F1 metrics evaluate the predicted categories (19 possible values) and associated higher level classes (5 possible values) for each edit operation, irrespective of group, respectively. Weighted multi-label F1 is used since an edit operation may belong to multiple categories (e.g., overlapping groups). "% Exact" is the percentage of reference groups for which there is an identical group in the predictions. "% Part" is the percentage of reference groups for which a predicted group of the same category has an operation set overlap of at least 0.5 as measured by the Jaccard index.

FIG. 12 is a table analyzing generated simplifications (e.g., those depicted in FIGS. 16A and 16B) based on a SARI score (higher is better), FKGL score (lower is better), and the percentage of identified edit categories.

FIG. 13 is a table depicting the performance of various models described herein on the page-pair alignment task. From top to bottom: baselines (Majority and APublish), string alignment, NER (Entity Overlap), NLI (SummaC-Doc), and supervised. "P" stands for precision, "R" stands for recall, and F1 is a score calculated from the precision and recall. Majority always predicts the majority class (Aligned), and APublish produces a score based on the difference in publication time of the two revisions. Levenshtein Ratio is the negated normalized Levenshtein distance, and Partial Levenshtein Ratio finds the longest common subsequence (LCS) between the two documents, and computes the LCS's Levenshtein Ratio, allowing penalty-free deletion/insertions at the extreme of either document. Entity Overlap uses spaCy's NER model to extract named entities from both revisions and computes the Jaccard index between the entity sets as a score, with the assumption that newly introduced entities can be a signal of new and unaligned information. SummaC is described herein. The Supervised model is a ROBERTa-Large fine-tuned on the 1,400 training samples, where the final model is selected based on the checkpoint that achieved the highest F1 score on the validation set.

FIG. 14 is a table depicting the number, N, and percentage of documents with edit, %∃, and Cohen's Kappa, k, measuring inter-annotator agreement level, for both manual annotation and silver-annotated datasets. Edit categories are grouped by class.

FIG. 15 is a table describing the results of the BIC model (e.g., 440 as described with respect to, and depicted in, FIG. 4C) per edit category. Categories are sorted in order of frequency in the dataset, and three metrics are reported that can be computed at the category level. "N" is the number of times an edit category appeared in the dataset. The five classes corresponding to numbers 1-5 are: 1 Lexical, 2 Syntactic, 3 Discourse, 4 Semantic, and 5 Non-Simplification.

FIG. 16A depicts simplifications from EW, model outputs from the ACCESS and Keep It Simple Models as described herein. The reference SEW page is also reproduced. Deletions are in strikethrough and insertions are underlined.

The ACCESS model was implemented using the original paper's code release, and the de-fault conditioning parameters of 0.95 for length target, 0.75 for Levenshtein target, and 0.75 for word-rank target.

For the Keep-it-Simple model a beam search (beam size of 4) to generate candidates, selecting the beam with the highest likelihood as the final generated candidate.

The GPT3-davinci-003 model was implemented using OpenAI's API access to the GPT3 model, with the following prompt: "Simplify the document below so it is accessible to a wider audience. Start of document:", with newlines inserted to delimit the task definition, the document, and the expected output. Default generation parameters provided in the interface were used. It is unclear whether GPT3 qualifies as a zero-shot model for simplification, since it is trained on Wikipedia (amongst others), and has therefore been trained on a super-set of the data in SWIPE, although it has not seen the explicit revision pairing available in SWIPE.

FIG. 16B depicts simplifications of EW page as model outputs from the two SWIPE-trained models (e.g., 714 in FIG. 7 and as described above) and the GPT3 zero-shot baseline as described herein. Deletions are in strikethrough and insertions are underlined. The reference SEW page is also reproduced.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a text simplification model, the method comprising:
   receiving, via a data interface, a training dataset including a first set of original textual samples and original revision histories of original textual samples and a second set of simplified textual samples and simplified revision histories of simplified textual samples, wherein each original revision history of a corresponding original textual sample includes a sequence of revisions to the original textual sample at a first set of times, and each simplified revision history of a corresponding simplified textual sample includes a sequence of revisions to the simplified textual sample at a second set of times;
   identifying a training pair including an original textual sample and the corresponding original revision history from the first set and a counterpart simplified textual sample and the corresponding simplified revision history from the second set;
   generating, via a neural network-based alignment model implemented on one or more hardware processors, an alignment label reflecting a first revision in the corresponding original revision history and a second revision in the corresponding simplified revision history belong to a same type of revision;
   generating, via a neural network-based classification model implemented on one or more hardware processors, a revision category label reflecting a category of the same time of revision;
   storing an updated training dataset including the training pair; and
   training a neural network-based text simplification model based on the updated training dataset.

2. The method of claim 1, wherein training the neural network-based text simplification model further comprises:
   generating, via the neural network-based text simplification model, a predicted simplified document from the original textual sample;
   computing a loss function based, at least in part, on the predicted simplified document and the counterpart simplified textual sample; and
   updating parameters of the text simplification model based on the loss function via backpropagation.

3. The method of claim 1, further comprising:
   receiving, via a data interface, a first document; and
   generating, using the trained neural network-based text simplification model, a second document from the first document; and
   outputting the second document.

4. The method of claim 1, further comprising:
   receiving, via a data interface, a set of preferred edit types and a first document; and
   generating, using the trained neural network-based text simplification model, a second document from the first document, wherein differences between the first and second document correspond to edits in the set of preferred edit types.

5. The method of claim 1, wherein the revision category label belongs to one of the classes: lexical, syntactic, discourse, semantic, or non-simplification.

6. The method of claim 1, wherein the storing further comprises processing the training pair into an alignment sequence, wherein the alignment sequence includes any of:
   a text found in both the original textual sample and the corresponding simplified textual sample,
   a text only in the original textual sample, and
   a text only in the corresponding simplified textual sample.

7. The method of claim 6, wherein the alignment sequence further includes the alignment label and the revision category label.

8. A system for training a text simplification model, the system comprising:
   a memory that stores a text simplification model and a plurality of processor-executable instructions;

a communication interface that receives a training dataset including a first set of original textual samples and original revision histories of original textual samples and a second set of simplified textual samples and simplified revision histories of simplified textual samples, wherein each original revision history of a corresponding original textual sample includes a sequence of revisions to the original textual sample at a first set of times, and each simplified revision history of a corresponding simplified textual sample includes a sequence of revisions to the simplified textual sample at a second set of times; and one or more hardware processors that read and execute the plurality of processor-executable instructions from the memory to perform operations comprising:

identifying a training pair including an original textual sample and the corresponding original revision history from the first set and a counterpart simplified textual sample and the corresponding simplified revision history from the second set;

generating, via a neural network-based alignment model implemented on one or more hardware processors, an alignment label reflecting a first revision in the corresponding original revision history and a second revision in the corresponding simplified revision history belong to a same type of revision;

generating, via a neural network-based classification model implemented on one or more hardware processors, a revision category label reflecting a category of the same time of revision;

storing an updated training dataset including the training pair; and training a neural network-based text simplification model based on the updated training dataset.

9. The system of claim 8, wherein the operation of training the neural network-based text simplification model based on the updated training dataset further comprises:

generating, via the neural network-based text simplification model, a predicted simplified document from the original textual sample;

computing a loss function based, at least in part, on the predicted simplified document and the counterpart simplified textual sample; and updating parameters of the text simplification model based on the loss function via backpropagation.

10. The system of claim 8, wherein the communication interface further receives a first document and operations further comprise:

generating, using the trained neural network-based text simplification model, a second document from the first document; and outputting the second document.

11. The system of claim 8, wherein the communication interface further receives a set of preferred edit types and a first document and operations further comprise:

generating, using the trained neural network-based text simplification model, a second document from the first document, wherein differences between the first and second document correspond to edits in the set of preferred edit types.

12. The system of claim 8, wherein the revision category label belongs to one of the classes: lexical, syntactic, discourse, semantic, or non-simplification.

13. The system of claim 8, wherein the operation of storing an updated training dataset including the training pair further comprises:

processing the training pair into an alignment sequence, wherein the alignment sequence includes any of:

a text found in both the original textual sample and the corresponding simplified textual sample, a text only in the original textual sample, and a text only in the corresponding simplified textual sample.

14. The system of claim 13, wherein the alignment sequence further includes the alignment label and the revision category label.

15. A non-transitory machine-readable medium comprising a plurality of machine-executable instructions which, when executed by one or more processors, are adapted to cause the one or more processors to perform operations comprising:

receiving, via a data interface, a training dataset including a first set of original textual samples and original revision histories of original textual samples and a second set of simplified textual samples and simplified revision histories of simplified textual samples, wherein each original revision history of a corresponding original textual sample includes a sequence of revisions to the original textual sample at a first set of times, and each simplified revision history of a corresponding simplified textual sample includes a sequence of revisions to the simplified textual sample at a second set of times;

identifying a training pair including an original textual sample and the corresponding original revision history from the first set and a counterpart simplified textual sample and the corresponding simplified revision history from the second set;

generating, via a neural network-based alignment model implemented on one or more hardware processors, an alignment label reflecting a first revision in the corresponding original revision history and a second revision in the corresponding simplified revision history belong to a same type of revision;

generating, via a neural network-based classification model implemented on one or more hardware processors, a revision category label reflecting a category of the same time of revision;

storing an updated training dataset including the training pair; and training a neural network-based text simplification model based on the updated training dataset.

16. The non-transitory machine-readable medium of claim 15, wherein training the neural network-based text simplification model further comprises:

generating, via the neural network-based text simplification model, a predicted simplified document from the original textual sample;

computing a loss function based, at least in part, on the predicted simplified document and the counterpart simplified textual sample; and updating parameters of the text simplification model based on the loss function via backpropagation.

17. The non-transitory machine-readable medium of claim 15, further comprises:

receiving, via a data interface, a first document; and generating, using the trained neural network-based text simplification model, a second document from the first document; and outputting the second document.

18. The non-transitory machine-readable medium of claim 15, further comprises:

receiving, via a data interface, a set of preferred edit types and a first document; and generating, using the trained neural network-based text simplification model, a second document from the first document, wherein differences between the first and second document correspond to edits in the set of preferred edit types.

19. The non-transitory machine-readable medium of claim 15, wherein the revision category label belongs to one of the classes: lexical, syntactic, discourse, semantic, or non-simplification.

20. The non-transitory machine-readable medium of claim 15, wherein the storing further comprises processing the training pair into an alignment sequence, wherein the alignment sequence includes any of:

a text found in both the original textual sample and the corresponding simplified textual sample, a text only in the original textual sample, and a text only in the corresponding simplified textual sample.

* * * * *